United States Patent
Muraoka

(10) Patent No.: US 12,128,669 B2
(45) Date of Patent: Oct. 29, 2024

(54) PRINTING PAD

(71) Applicant: Shuhou Co., Ltd., Fukui (JP)

(72) Inventor: Kouji Muraoka, Fukui (JP)

(73) Assignee: Shuhou Co., Ltd., Fukui (JP)

( * ) Notice: Subject to any disclaimer, the term of this patent is extended or adjusted under 35 U.S.C. 154(b) by 0 days.

(21) Appl. No.: 17/922,455

(22) PCT Filed: Apr. 28, 2022

(86) PCT No.: PCT/JP2022/019263
§ 371 (c)(1),
(2) Date: Oct. 31, 2022

(87) PCT Pub. No.: WO2023/209941
PCT Pub. Date: Nov. 2, 2023

(65) Prior Publication Data
US 2024/0217228 A1 Jul. 4, 2024

(51) Int. Cl.
*B41F 17/00* (2006.01)
*B32B 1/00* (2006.01)
(Continued)

(52) U.S. Cl.
CPC ............... *B41F 31/24* (2013.01); *B32B 1/00* (2013.01); *B32B 5/18* (2013.01); *B32B 7/022* (2019.01);
(Continued)

(58) Field of Classification Search
None
See application file for complete search history.

(56) References Cited

U.S. PATENT DOCUMENTS

| | | | |
|---|---|---|---|
| 2,748,696 A * | 6/1956 | Murray | B41F 17/001 |
| | | | 101/379 |
| 7,870,823 B1 | 1/2011 | Cameron | |
| 2012/0222574 A1* | 9/2012 | Inoue | B41M 1/40 |
| | | | 101/368 |
| 2018/0154672 A1* | 6/2018 | Muraoka | B41N 10/04 |

FOREIGN PATENT DOCUMENTS

| | | |
|---|---|---|
| JP | H0285140 U | 7/1990 |
| JP | 2013146569 A | 8/2013 |

(Continued)

OTHER PUBLICATIONS

English language translation of KR-102203327-B1 to Im, publication date Jan. 15, 2021. (Year: 2021).*

(Continued)

*Primary Examiner* — Leslie J Evanisko
(74) *Attorney, Agent, or Firm* — BUCHANAN, INGERSOLL & ROONEY PC

(57) ABSTRACT

A printing pad includes a printing surface to be pushed against a printing original plate and a surface to be printed, the printing original plate having ink placed on the printing original plate; an inner layer disposed inside the printing pad; and an outer layer provided in contact with a surface of the inner layer that is closer to where the printing surface is disposed than is an opposite surface of the inner layer. The outer layer has the printing surface on an outside surface of the outer layer, and is formed such that the printing surface is brought into close contact with the surface to be printed to conform to the surface to be printed when the printing surface is pushed against the surface to be printed, and the inner layer has a cavity provided in the inner layer.

9 Claims, 14 Drawing Sheets

(51) Int. Cl.
  *B32B 5/18* (2006.01)
  *B32B 7/022* (2019.01)
  *B32B 25/04* (2006.01)
  *B32B 25/20* (2006.01)
  *B41F 16/00* (2006.01)
  *B41F 17/34* (2006.01)
  *B41F 31/24* (2006.01)
  *B41M 1/40* (2006.01)

(52) U.S. Cl.
  CPC .......... *B32B 25/042* (2013.01); *B32B 25/045* (2013.01); *B32B 25/20* (2013.01); *B41F 16/0086* (2013.01); *B41F 17/001* (2013.01); *B41F 17/34* (2013.01); *B32B 2307/536* (2013.01); *B41M 1/40* (2013.01)

(56) References Cited

FOREIGN PATENT DOCUMENTS

| | | | |
|---|---|---|---|
| JP | 2017170910 A | 9/2017 | |
| JP | 6689375 B2 | 4/2020 | |
| KR | 102203327 B1 * | 1/2021 | ............ B41F 17/001 |
| WO | 2021166115 A1 | 8/2021 | |

OTHER PUBLICATIONS

International Search Report (PCT/ISA/210) and Written Opinion (PCT/ISA/237) mailed on Jun. 21, 2022, by the Japan Patent Office as the International Searching Authority for International Application No. PCT/JP2022/019263. (9 pages).

* cited by examiner

PRINTING PAD

TECHNICAL FIELD

The present disclosure relates to a printing pad with which printing is performed by linearly moving the printing pad to push a printing surface against a surface to be printed, and particularly relates to the internal structure of the printing pad.

BACKGROUND ART

In some offset printing, a printing surface of a printing pad is pushed against a printing original plate to transfer ink placed on the printing original plate and corresponds to a print pattern to the printing pad. Then, the printing surface of the printing pad to which the ink is transferred is pushed against a surface to be printed to transfer the ink to the surface to be printed, so that the print pattern is printed on the surface to be printed.

In the disclosure disclosed in Patent Literature 1, a printing pad is pushed against a printing original plate. Ink in a fine dot pattern is placed on the printing original plate. The ink held on the printing original plate is transferred to the printing pad that is pushed against the printing original plate. The printing pad is pushed against the printing original plate, so that the ink is transferred to the printing pad. The ink is transferred to an item to be printed from the printing pad.

The ink placed on the printing original plate is transferred to the printing surface of the printing pad (printing blanket) disclosed in Patent Literature 1, and the ink transferred to the printing surface is transferred to the item to be printed. The printing pad includes an inner layer and an outer layer provided in contact with the outside of the inner layer. The inner layer and the outer layer have different degrees of hardness to allow the printing pad to conform to the item to be printed having an uneven shape, so that the printing pad allows printing even on the surface to be printed having a complicated shape.

CITATION LIST

Patent Literature

Patent Literature 1: Japanese Patent No. 6689375

SUMMARY OF INVENTION

Technical Problem

However, to perform printing on a surface to be printed having a complicated shape, the printing pad disclosed in Patent Literature 1 is formed such that the printing surface on the surface of the printing pad has an area larger than the area of the surface to be printed. The printing pad is an elastic body made of silicone rubber, for example. To cause the printing pad to conform to the surface to be printed having a complicated shape, it is necessary to cause the printing pad to be deformed to such an extent that the printing surface is brought into close contact with the entire area of the surface to be printed, which is an object to be printed. Accordingly, the printing pad requires a large elastic body to form the printing surface, thus increasing dimensions and weight and hence, there is a problem in that it is difficult to handle the printing pad at the time of replacing the printing pad, for example.

The present disclosure has been made to solve the above-mentioned problem, and it is an object of the present disclosure to provide a printing pad that is lightweight and made of a limited amount used of a material and allows printing on a surface to be printed having a complicated shape.

Solution to Problem

A printing pad according to an embodiment of the present disclosure includes a printing surface to be pushed against a printing original plate and a surface to be printed, the printing original plate having ink placed on the printing original plate, the surface to be printed being an object to be printed; an inner layer disposed inside the printing pad; and an outer layer provided in contact with a surface of the inner layer that is closer to where the printing surface is disposed than is an opposite surface of the inner layer. The outer layer has the printing surface on an outside surface of the outer layer, and is formed such that the printing surface is brought into close contact with the surface to be printed to conform to the surface to be printed when the printing surface is pushed against the surface to be printed, and the inner layer has a cavity provided in the inner layer.

Advantageous Effects of Invention

According to an embodiment of the present disclosure, the weight of the elastic body used for the printing pad is reduced and hence, the printing pad is easily handled at the time of replacing the printing pad, for example, and a material cost for the printing pad is reduced, leading to a reduction in cost.

DESCRIPTION OF EMBODIMENTS

Embodiment 1

Figure 1:
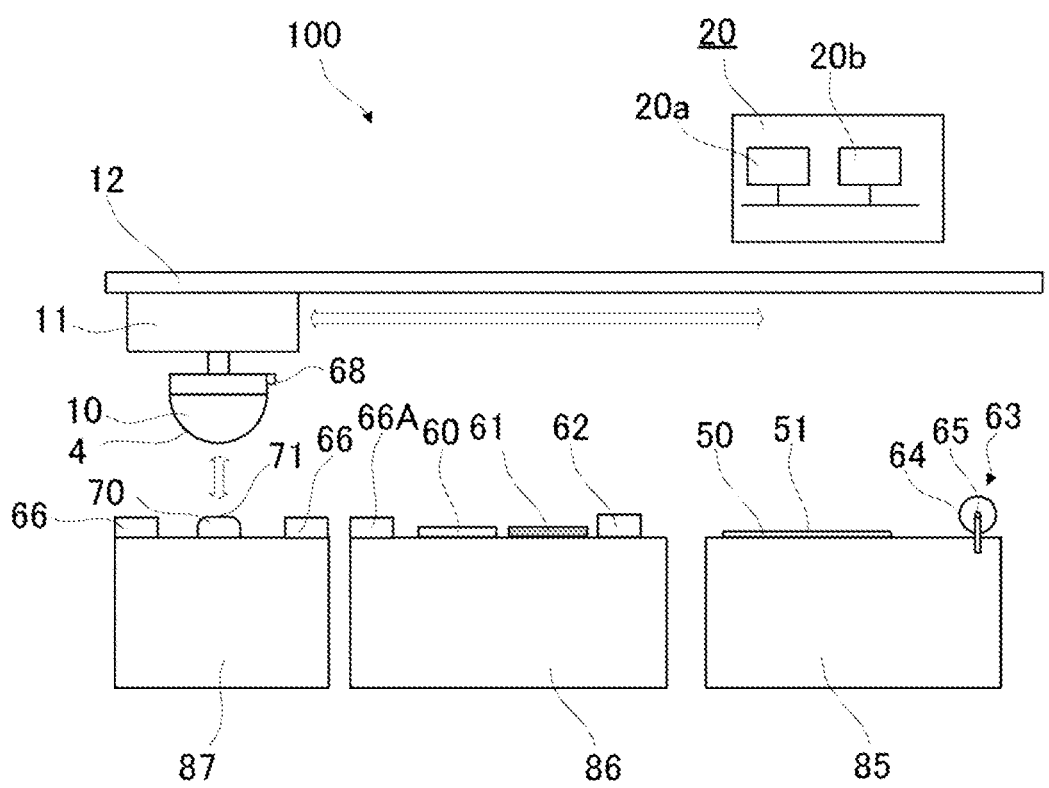
FIG. 1 is a side view showing one example of a printing apparatus 100 according to Embodiment 1.

Hereinafter, a printing pad according to the present disclosure will be described with reference to drawings. The present disclosure is not limited by an embodiment described hereinafter. In the drawings, identical components are given the same reference signs, and the description of such components is partially omitted. The drawings are schematically drawn, and the present disclosure is not limited to the shape shown in the drawings. Further, in the specification, an elastic body or a body having elasticity is not limited to a body having a linear relationship between the load applied to the body and the amount of deformation generated by the load. The elastic body or the body having elasticity includes a body where the load applied to the body and the amount of deformation generated by the load have a non-linear relationship, and the shape of the body returns to the original shape when the applied load is removed immediately or after a predetermined time period.

<Printing Apparatus 100>

FIG. 1 is a side view showing one example of a printing apparatus 100 according to Embodiment 1. The printing apparatus 100 is an apparatus that transfers ink placed on a printing original plate 50 to a printing surface 4 of a printing pad 10, and then transfers the ink transferred to the printing surface 4 to a surface to be printed 71 of an item to be printed 70. There may be a case where the surface to be printed 71 has an uneven shape. The printing apparatus 100 is an apparatus that can perform printing also on an inclined surface in the case where the surface to be printed 71 has a surface inclined to a direction in which the printing pad 10 is pushed.

The printing apparatus 100 includes the printing pad 10 that can move linearly in the vertical direction. The printing pad 10 is a pad that is vertically moved by a vertically moving device 11 included in the printing apparatus 100, and that pushes the printing surface 4 against the surface to be printed 71 of the item to be printed 70 to transfer ink transferred to the printing surface 4 to the surface to be printed 71. The printing apparatus 100 also includes a horizontally moving device 12. The horizontally moving device 12 moves the printing pad 10 and the vertically moving device 11 in the horizontal direction. The printing pad 10 is, by the horizontally moving device 12, moved to an area above the item to be printed 70, a cleaning device 60, an activation device 61, an air blowing device 62, and the printing original plate 50. The printing surface 4 of the printing pad 10 is vertically moved by the vertically moving device 11, thus being pushed against each of the item to be printed 70, the cleaning device 60, the activation device 61, and the printing original plate 50. In FIG. 1, the printing apparatus 100 includes, from the left, a printing stage 87, a surface treatment stage 86, and a printing original plate stage 85. The item to be printed 70 is placed on the printing stage 87. The cleaning device 60, the activation device 61, and the air blowing device 62 are provided at the surface treatment stage 86. The printing original plate 50 is to be placed on the printing original plate stage 85. However, in the printing apparatus 100, these stages may be freely arranged, and the arrangement may be changed to be suited to the convenience of the operator or the location where the printing apparatus 100 is installed, for example. Further, each of the devices of the printing apparatus 100 is installed in the printing apparatus 100 as necessary, and there may be a case where such a device of the printing apparatus 100 is not installed.

As shown in FIG. 1, blowers 66 are installed on the printing stage 87. The blower 66 is a blower that sends air toward the printing surface 4 of the printing pad 10. The printing apparatus 100 may include any one of the blower 66 and the air blowing device 62, and configured to cause the one of the blower 66 and the air blowing device 62 to serve as the blower 66 and air blowing device 62.

<Printing Pad 10>

Figure 2:
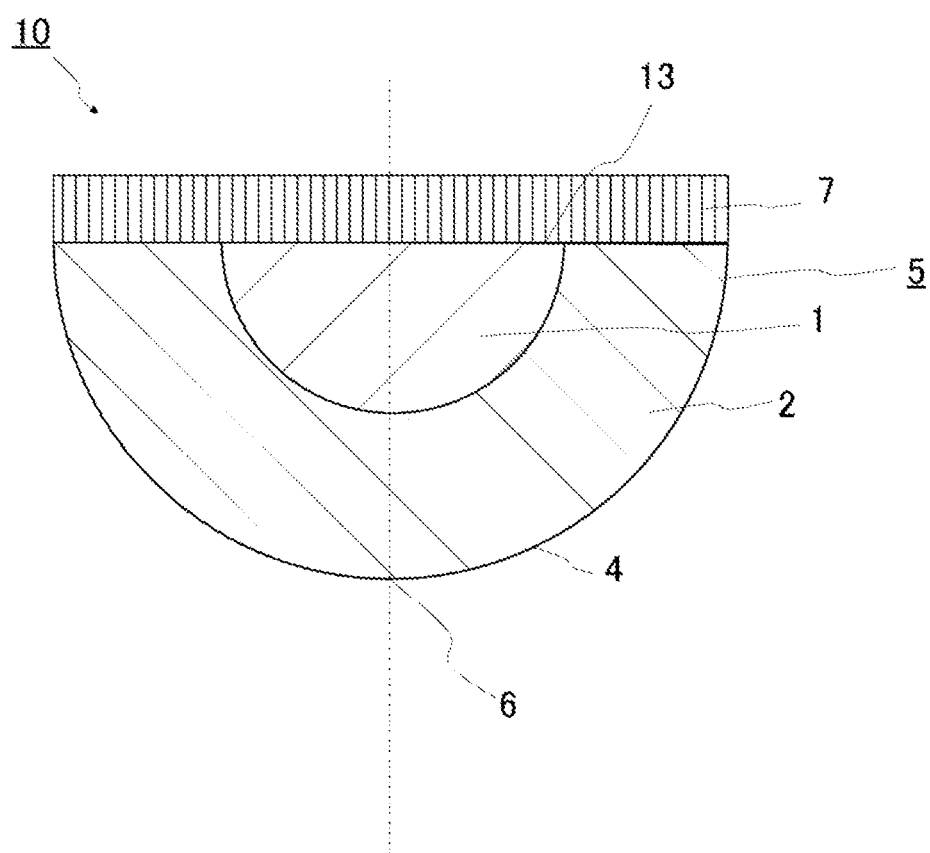
FIG. 2 is a cross-sectional view showing one example of a printing pad 10 included in the printing apparatus 100 according to Embodiment 1.

FIG. 2 is a cross-sectional view showing one example of the printing pad 10 included in the printing apparatus 100 according to Embodiment 1. FIG. 2 is a cross-sectional view of the printing pad 10 shown in FIG. 1, and shows a cross section that passes through an apex 6 of the printing pad 10 and that is perpendicular to a flat surface 13 of a support part 7 to which a base 5 is fixed. The printing pad 10 has a substantially hemispherical shape, for example. The shape of the printing pad 10 is not limited to such a shape, and may be changed to, for example, a cannonball shape, a shape having a curved surface obtained by rotating a parabola about the axis of symmetry of the parabola, a shape of a portion of an ellipsoid obtained by cutting the ellipsoid or other shape, a shape obtained by continuously extending the cross section of the cannonball shape or a semicircular shape along a straight line, or other shapes suited to the specifications or other factor of the item to be printed 70. The printing pad 10 has a vertex that comes into contact with the item to be printed 70 or the printing original plate 50 first, and the vertex is in the form of a point or a line. With such a configuration, when the printing pad 10 is pushed against the item to be printed 70 or the printing original plate 50, air is prevented from being caught between the printing surface 4 and the item to be printed 70 or the printing original plate 50. By preventing air from being caught, it is possible to limit the generation of a void of ink 40 in transferring the ink 40 from the printing original plate 50 to the printing pad 10 and the generation of a void in a print image applied to the item to be printed 70. In Embodiment 1, of the surface of the printing pad 10, a predetermined range centered about the apex 6 forms the printing surface 4 to which ink 40 is moved from the printing original plate 50 to transfer the ink 40 to the item to be printed 70. However, the printing surface 4 may be set to include no apex 6.

As shown in FIG. 2, the base 5 of the printing pad 10 has an inner layer 1 and an outer layer 2, which is disposed to cover the outside surface of the inner layer 1. Each of the inner layer 1 and the outer layer 2 is fixed to the support part 7. The printing pad 10 is not limited to a two-layered structure, and may further have a multilayer structure having more than two layers.

The outer layer 2 is formed by molding silicone rubber, for example. The outer layer 2 has elasticity (flexibility), and silicone oil is mixed to facilitate deformation. In Embodiment 1, the outer layer 2 has a substantially hemispherical shape. However, the shape of the outer layer 2 may be changed to be suited to the specifications or other factor of the item to be printed 70. When the printing pad 10 is pushed against the printing original plate 50, the outer layer 2 is deformed to cause ink 40 (see FIG. 3) placed on a placement surface 51 of the printing original plate 50 to move to the printing surface 4. The ink 40 placed on the placement surface 51 of the printing original plate 50 is disposed to be suited to an image to be printed on the item to be printed 70, thus forming a print pattern.

Figure 3:
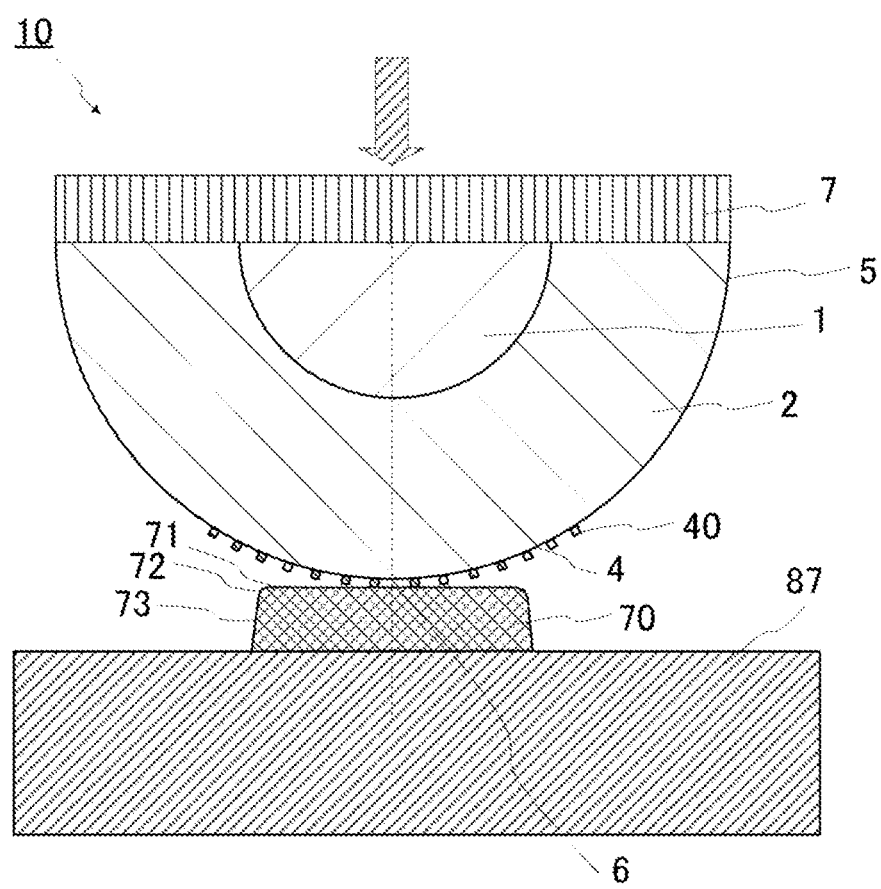
FIG. 3 is a cross-sectional view when the printing pad 10 included in the printing apparatus 100 according to Embodiment 1 is pushed against an item to be printed 70.
Figure 4:
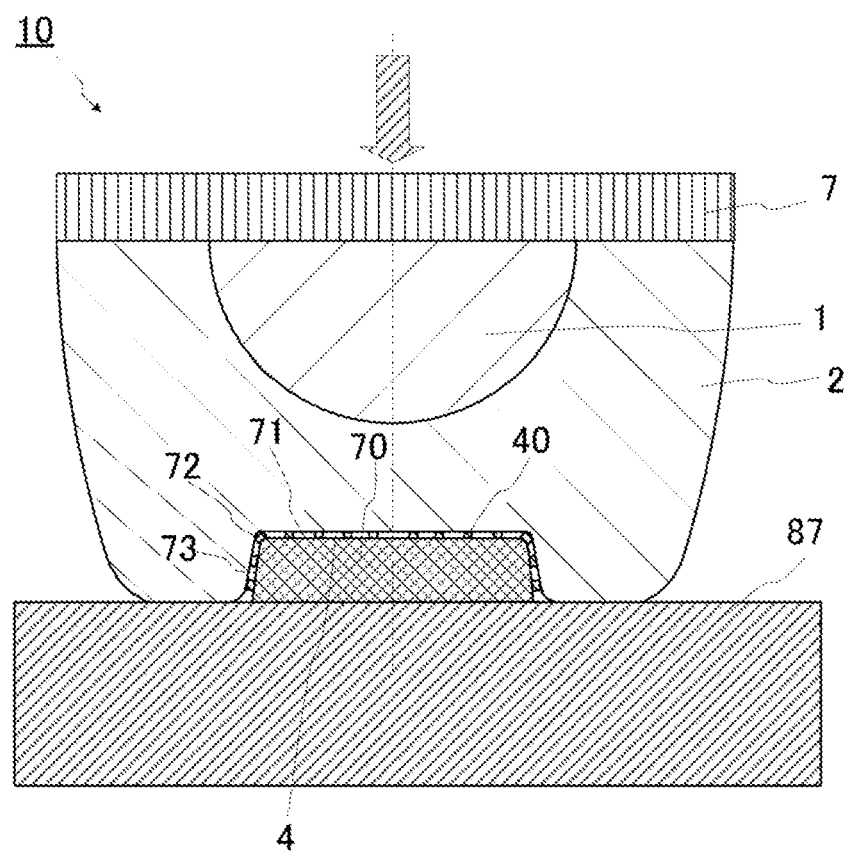
FIG. 4 is a cross-sectional view when the printing pad 10 included in the printing apparatus 100 according to Embodiment 1 is pushed against the item to be printed 70.

FIG. 3 and FIG. 4 are cross-sectional views when the printing pad 10 included in the printing apparatus 100 according to Embodiment 1 is pushed against the item to be printed 70. As shown in FIG. 4, for example, the inner layer 1 is formed to be hardly deformed even in the case where the outer layer 2 is pushed against the item to be printed 70, so that the printing surface 4 is deformed to conform to the surfaces to be printed 71, 72 and 73. In such a case, for example, a material of the outer layer 2, forming a portion closer to the printing surface 4 than is the inner layer 1, is set to a material having Asker C hardness in a range of 0 to 20 points. The inner layer 1 disposed inside the outer layer 2 is made of plastic foam, for example. The inner layer 1 is made of foamed plastic, such as ABS foam and polystyrene foam. That is, the inner layer 1 has a structure that has cavities in the inside of the inner layer 1. In Embodiment 1, the cavities are fine air bubbles. The inner layer 1 is a part that has cavities in the inside and that has strength and rigidity of a level that allows the inner layer 1 to maintain its shape when the printing pad 10 is pushed against the item to be printed 70.

The inner layer 1 is disposed at a position where the inner layer 1 can apply a force for pushing the printing surface 4 against the surfaces to be printed 71, 72, and 73 during printing, and is disposed inside the outer layer 2 as viewed from the printing surface 4. The support part 7 is a portion that is connected to the vertically moving device 11, and that transfers a force from the vertically moving device 11 to the printing pad 10.

To allow the printing pad 10 to be deformed to conform to the surfaces to be printed 71, 72, and 73, it is desirable to set hardness of the printing pad 10 to a low level (a soft level). Therefore, it is necessary to set hardness of the portion of the printing pad 10 including the printing surface 4, which is to be pushed against the item to be printed 70, that is, hardness of the outer layer 2, to a lower level than a hardness level of the inner layer 1. By forming the outer layer 2 as described above, the printing surface 4 can easily conform to the surfaces to be printed 71, 72 and 73 because of a soft layer, and the shape of the entire printing pad 10 can be easily held by the inner layer 1, which is hardly deformed even when the printing pad 10, is pushed against the item to be printed 70. In addition to the above, the outer layer 2, which is directly pushed against the surfaces to be printed 71, 72, and 73, has an advantageous effect that the outer layer 2 can be easily deformed to conform not only to the surface to be printed 71, but also to the surface to be printed 72, which is a curved surface, and the surface to be printed 73, which is inclined to a direction along which the printing pad 10 moves. However, degrees of hardness of each of the portions of the base 5 are not limited to the above-mentioned degrees of hardness.

It is preferable to form the printing pad 10 such that the printing surface 4 at least ensures an area 1.5 or more times greater than the area of the surfaces to be printed 71, 72 and 73. With such a configuration, when the printing pad 10 is pushed against the item to be printed 70, the printing pad 10 has a reduced deformation rate (the ratio of the amount of deformation to the size of the printing pad 10) and hence, it is possible to limit slippage of the printing surface 4 against the surface to be printed. Also by reducing hardness of the printing pad 10, it is possible to limit slippage of the printing surface 4 against the surface to be printed. In Embodiment 1, the printing surface 4 is on the surface of the outer layer 2. The surface of the inner layer 1 that faces the surface (the printing surface 4) may have a shape similar to the shape of the surface of the outer layer 2. It is preferable that the volume of the inner layer 1 including cavities (air bubbles in the inner layer 1 in Embodiment 1) in the inner layer 1 be set to 40% or less of the volume of the entire base 5.

<Cleaning Device 60>

As shown in FIG. 1, the surface treatment stage 86 is disposed adjacent to the printing stage 87 of the printing apparatus 100. The cleaning device 60 is installed on the surface treatment stage 86. The cleaning device 60 includes a piece of paper or an adhesive tape, for example. The printing surface 4 of the printing pad 10 is pushed against the surface of the piece of paper or the adhesive tape, so that the ink 40, stains, dust and other substance remaining after printing are removed.

<Activation Device 61>

The activation device 61 includes a storage tank that stores liquid, and an absorbing unit that absorbs and holds the liquid. When the printing surface 4 of the printing pad 10 is pushed against the surface of the absorbing unit, the liquid held by the absorbing unit thereby adheres to the printing surface 4 of the printing pad 10. The printing pad 10 is a pad where water or solvent is caused to adhere to or permeate into the base 5 to facilitate transfer of the ink 40 placed on the printing original plate 50 to the printing surface 4. A suited liquid is selected on the basis of its properties having compatibility with the ink 40, and the liquid has properties of softening the hard ink 40. The ink 40 is formed by adding pigment or dye to water or solvent. A liquid used for the activation device 61 is, for example, a mixture of a synthetic resin, such as an acrylic resin and a urethane resin, and water, thinner, xylene, toluene, or other substance. It is preferable to select a mixture having a high affinity for a solvent contained in the ink 40. However, a liquid used for the activation device 61 is not limited to the above.

The absorbing unit of the activation device 61 may be formed by laminating thin absorbing materials each having a sheet shape, for example. The absorbing material may be a piece of paper, for example. However, the absorbing material is not limited to only a piece of paper. As long as the absorbing material absorbs liquid, the absorbing material may be made of any of other materials, such as cloth and resin. For example, the absorbing unit may be a unit obtained by laminating pieces of paper on a sponge-like resin. There may be a case where stains, such as the ink 40 remaining on the printing surface 4 of the printing pad 10, adhere to the surface of the absorbing unit, against which the printing surface 4 of the printing pad 10 is pushed, or a case where a piece of paper included in the absorbing unit is torn as the surface of the absorbing unit is scratched. For this reason, the absorbing unit is formed such that the laminated pieces of paper can be removed one by one by peeling off and removing the piece of paper positioned in the uppermost layer of the absorbing unit from the uppermost layer of the absorbing unit, or an upper layer portion can be mechanically replaced. However, a method of replacing a piece of paper positioned in the uppermost layer is not limited to the above. The absorbing unit is formed such that a piece of paper or other material forming the uppermost layer can be removed or replaced and hence, the surface of the absorbing unit is always maintained clean, and liquid permeates through the surface of the absorbing unit. Therefore, pushing the printing surface 4 of the printing pad 10 against the surface of the absorbing unit can activate a printing surface. The absorbing unit of the activation device 61 is not limited to a laminated structure, and may be formed by a single part.

<Air Blowing Device 62>

The air blowing device 62 is a device that adjusts an amount of water or solvent caused to adhere to the printing surface 4 of the printing pad 10 by the activation device 61 to an appropriate amount. The air blowing device 62 removes excess water or solvent from the printing surface 4 by blowing air toward the printing surface 4 before ink is transferred to the printing surface 4 and after the printing surface 4 is pushed against the activation device 61. Note that the type of the air blowing device 62, the number of air blowing devices 62, and a direction along which air is blown are not limited. Further, as long as an amount of liquid caused to adhere to the printing surface 4 can be controlled to an appropriate amount by the activation device 61, the air blowing device 62 may be omitted.

<Printing Original Plate 50>

The printing original plate 50 is a plate that is placed on the printing original plate stage 85. When the ink 40 is placed on the placement surface 51, and the printing surface 4 of the printing pad 10 is pushed against the placement surface 51, the ink 40 is transferred to the printing surface 4.

Figure 5:
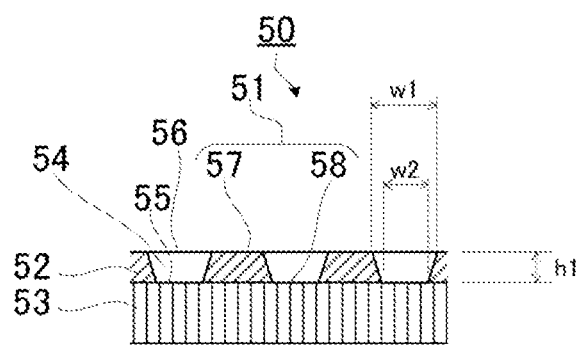
FIG. 5 is a cross-sectional view showing one example of a printing original plate 50 used in the printing apparatus 100 according to Embodiment 1.

FIG. 5 is a cross-sectional view showing one example of the printing original plate 50 used in the printing apparatus 100 according to Embodiment 1. The printing original plate 50 shown in FIG. 5 is an intaglio plate. The printing original plate 50 has a flat plate shape, and includes a support body 53 and a surface layer 52 formed on the support body 53. At least portions of the surface layer 52 including the placement surface 51, against which the printing surface 4 of the printing pad 10 is pushed, are made of a material having an ink-phobic property. The surface layer 52 is a layer that is partially broken and removed by a laser beam, for example, to remove portions made of a material having an ink-phobic property. That is, portions of the surface layer 52 are removed by a laser beam, for example, to form recessed portions 54 that are open to the placement surface 51. The support body 53 made of an ink-philic material is exposed from bottom portions 55 of the recessed portions 54. In Embodiment 1, the surface layer 52 is an ink-phobic layer having the ink-phobic property where the ink 40 is less likely to adhere. The support body 53 is an ink-philic layer having an ink-philic property where the ink 40 easily adheres. In Embodiment 1, the surface layer 52 is made of silicone rubber or silicone resin, for example. The silicone rubber and the silicone resin have an ink-phobic property, and are chemically stable, thus being preferably used for the surface layer 52 of the printing original plate 50. However, the material of the surface layer 52 is not limited to only silicone rubber and silicone resin, and any other material may be used, as long as the material has an ink-phobic property.

In FIG. 5, each of the surface layer 52 and the support body 53 has one layer. However, the surface layer 52 and the support body 53 are not limited to such forms. The surface layer 52 may have one layer made of a material that has an ink-phobic property and that is broken by a laser beam, for example. Alternatively, the surface layer 52 may have an ink-phobic layer at a position against which the printing pad 10 is pushed, and the surface layer 52 may have a recording layer at a position closer to the support body 53 than is the ink-phobic layer. The recording layer is a layer that absorbs a laser beam, for example, and converts the laser beam to heat, thus reducing the adhesive strength between the recording layer and the ink-phobic layer to allow the ink-phobic layer to be removed from the printing original plate 50. Alternatively, the recording layer is a layer that absorbs a laser beam, for example, and converts the laser beam to heat, thus being broken by the heat, so that the recording layer reduces a bonding force between the support body 53 and the surface layer 52, thus allowing the surface layer 52 having the ink-phobic property to be removed from the printing original plate 50. In the case where the surface layer 52 is formed by the ink-phobic layer and the recording layer, the ink-phobic layer is made of silicone rubber or silicone resin, and the recording layer is made of a thermosensitive material or a photosensitive material. In Embodiment 1, intaglio printing is adopted for printing. However, relief printing may be adopted for printing.

The support body 53 may have one layer of a metal plate made of aluminum, for example, for holding the shape of the printing original plate 50, for example, or the support body 53 may have an ink-philic layer formed on the surface of a metal plate by use of a material having an ink-philic property. Further, the support body 53 may be subject to surface treatment of roughening the surface of a metal plate by corrosion or other phenomenon. A primer layer may be formed on the surface of the support body 53 to increase a bonding force between the support body 53 and the surface layer 52.

Portions of the surface layer 52 are removed, so that the recessed portions 54 are formed on the printing original plate 50. The ink 40 is supplied to the placement surface 51 by an ink placement device 63, so that the ink 40 is placed in each recessed portion 54. At this point of operation, portions where the surface layer 52 remains form an ink-phobic region 57, and the ink 40 does not adhere to the ink-phobic region 57. The recessed portions 54 form an ink-philic region 58, and the ink 40 is placed in the ink-philic region 58. That is, the placement surface 51 has the ink-phobic region 57 and the ink-philic region 58, and the ink 40 is placed only in the ink-philic region 58 by the ink placement device 63.

In Embodiment 1, the surface layer 52 is formed with a thickness h1 of 3 μm or less, for example. In the case where the recessed portions 54 are formed by removing portions of the surface layer 52, a width w1, which is a width dimension of an opening port 56 of the recessed portion 54, is larger than a width w2, which is a width dimension of a bottom portion 55 of the recessed portion 54 in the direction along the placement surface 51. However, setting the thickness h1 of the surface layer 52 to 3 μm or less reduces a difference between the width w2 of the bottom portion 55 of the recessed portion 54 and the width w1 of the opening port 56. Therefore, the capacity in the recessed portion 54 is reduced. Further, the surface layer 52 is formed with the thickness h1 of 3 μm or less, so that energy can be easily supplied to a layer photosensitive to a laser beam at the time of forming the recessed portions 54 with the laser beam. The laser beam can form the shape of the bottom portion 55 of each recessed portion 54 formed on the printing original plate 50 with high accuracy and hence, the width w2 can be further reduced.

The bottom portion 55 of the recessed portion 54 is formed with the width w2 of 20 μm or less, desirably with the width w2 of 10 μm or less, and more desirably with the width w2 of 5 μm or less.

<Ink Placement Device 63>

As shown in FIG. 1, the ink placement device 63 includes an ink holding unit 64 that is a roller having a surface to which a material that holds ink is provided. The ink holding unit 64 is formed to rotate about a rotary shaft 65. The ink placement device 63 causes the ink holding unit 64 to rotate and move on the placement surface 51 of the printing original plate 50 with the ink holding unit 64 being in contact with the placement surface 51 to place the ink 40 in the ink-philic region 58 on the placement surface 51. The configuration of the ink placement device 63 is not limited to a configuration that includes the roller shown in FIG. 1. As long as a configuration allows the ink holding unit 64 to come into contact with the placement surface 51 of the printing original plate 50, the ink placement device 63 may be of a type where the ink holding unit 64 moves vertically from and to the placement surface 51, for example.

The printing original plate 50 has the ink-phobic region 57 and the ink-philic region 58, and the ink-phobic region 57 repels ink. Therefore, even when the ink-philic region 58 has fine portions, the ink placement device 63 can place ink in the ink-philic region 58. Further, the ink-phobic region 57 repels excess ink and hence, it is not always necessary for the ink placement device 63 to be provided with a doctor blade that removes excess ink after ink is placed.

In printing a color image on the surface of the item to be printed 70, there may be a case where the plurality of single color printing original plates 50 are used. In such a case, the printing apparatus 100 may include a plurality of ink placement devices 63. Alternatively, printing may be performed on one item to be printed 70 by the plurality of printing apparatuses 100. In such a case, each of the plurality of printing apparatuses 100 corresponds to one of the plurality of single color printing original plates 50.

<Blower 66>

Figure 6:
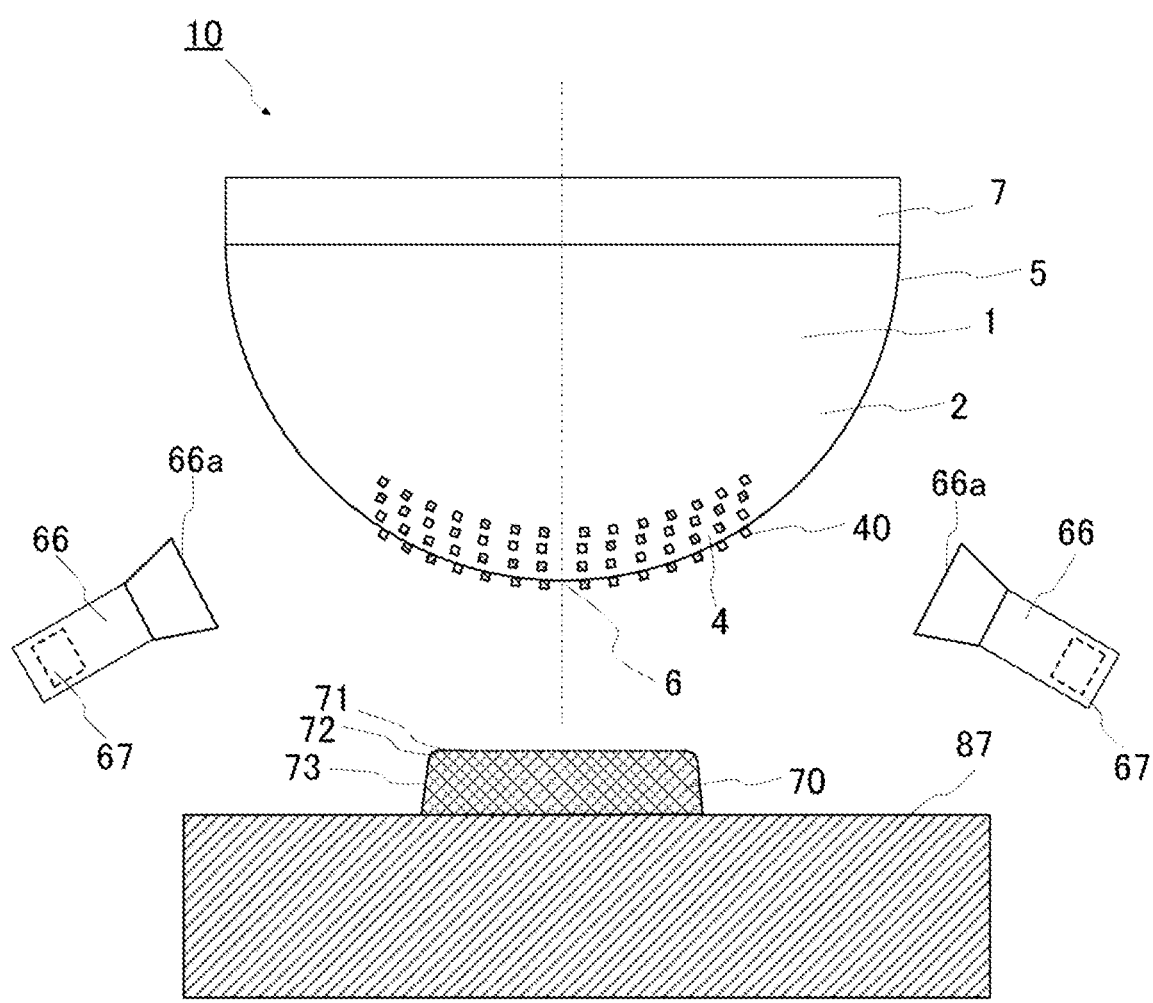
FIG. 6 is a schematic view of an area around a printing stage 87 of the printing apparatus 100 according to Embodiment 1.

FIG. 6 is a schematic view of an area around the printing stage 87 of the printing apparatus 100 according to Embodiment 1. The printing apparatus 100 includes the blowers 66 configured to send air to the printing surface 4 in a state where the ink 40 is transferred to the printing surface 4 of the printing pad 10. In Embodiment 1, the blowers 66 are disposed around an area where the item to be printed 70 is placed on the printing stage 87. Each blower 66 blows air toward the printing surface 4 before the printing surface 4 is pushed against the surfaces to be printed 71, 72 and 73 with the ink 40 adhering to the printing surface 4. The blower 66 blows air toward the printing surface 4 to evaporate liquid caused to adhere to the printing surface 4 by the activation device 61 and liquid, such as solvent, permeating the ink 40. With such an operation, an affinity between the ink 40 and the printing surface 4 is reduced. Further, the viscosity of the ink 40 is increased. That is, by sending air with the blowers 66, the ink 40 is cured.

In Embodiment 1, each blower 66 is disposed with a blowing port 66a facing the printing surface 4 of the printing pad 10 before the printing surface 4 of the printing pad 10 comes into contact with the item to be printed 70. It is preferable that the blower 66 be installed at a plurality of portions to cause air to impinge on the printing surface 4. The blower 66 may include a heater 67 in the inside to adjust the temperature of air to be sent to the printing surface 4. The temperature of air to be sent to the printing surface 4 may be adjusted by detecting the temperature of air to be sent to the printing surface 4 with a temperature sensor 68 (see FIG. 8) and by adjusting the output from the heater 67. Further, a configuration may be adopted where the temperature sensor 68 detects the temperature of surroundings in the room where the printing apparatus 100 is installed, and output from the heater 67 is adjusted depending on the temperature of the room. For example, a cylindrical housing of the blower 66 has the blowing port 66a at one end of the housing, and has an inflow port 66b at the other end of the housing, a fan and the heater 67 being installed in the housing at a portion closer to the other end of the housing than is the one end of the housing to take air into the housing.

Figure 7:
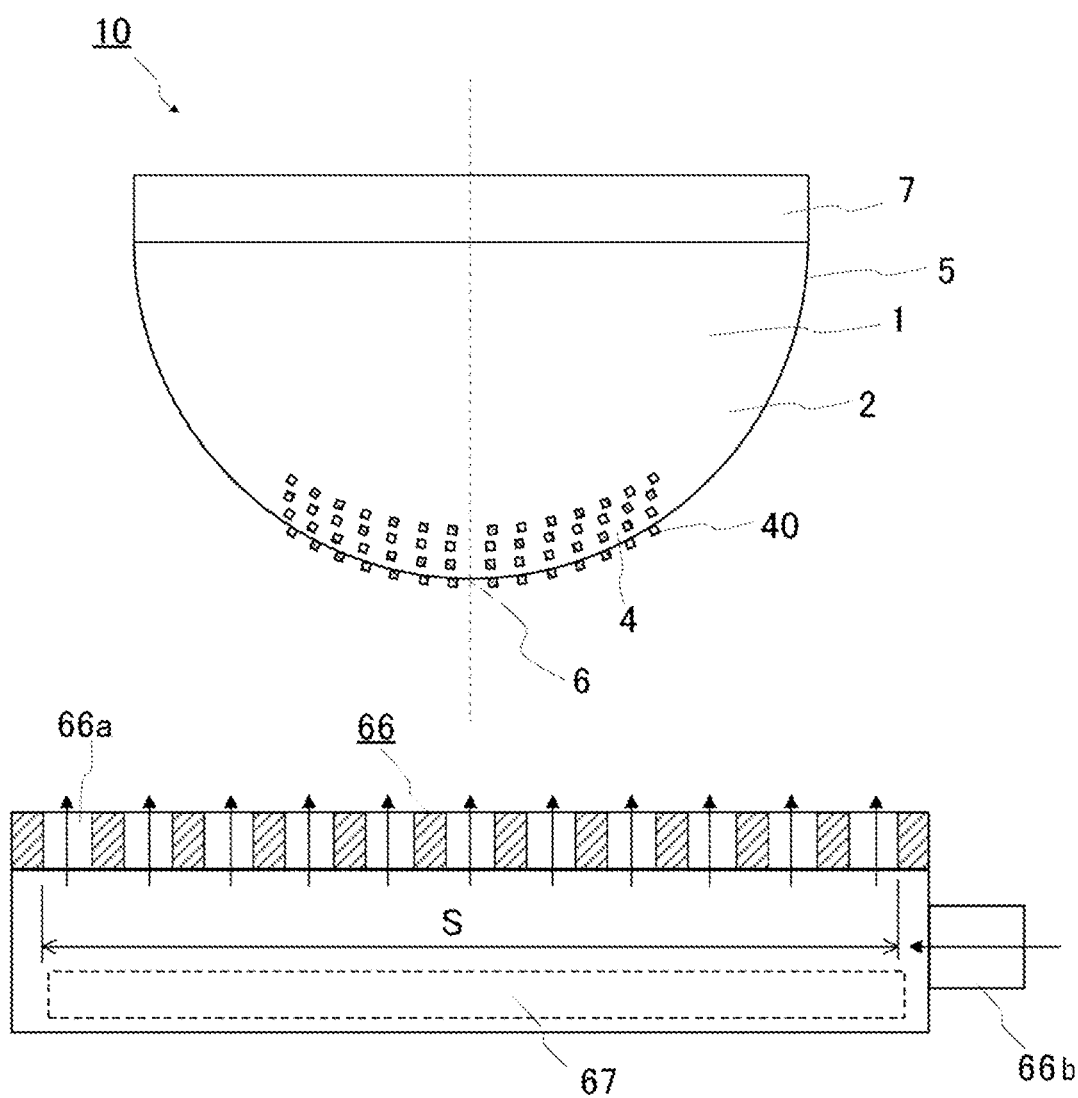
FIG. 7 shows a modification of a blower 66 of the printing apparatus 100 according to Embodiment 1.

FIG. 7 shows a modification of the blower 66 of the printing apparatus 100 according to Embodiment 1. The blower 66 is not limited to a dryer type shown in FIG. 6. The blower 66 may adopt a form where a large number of holes are provided in a flat plate, for example, to form the blowing ports 66a. The blower 66 shown in FIG. 7 may be provided at the printing stage 87 or other stages. For example, as in the case of a blower 66A shown in FIG. 1, the blower may be provided at the surface treatment stage 86. The printing pad 10 to which the ink 40 is transferred is controlled such that, before the printing pad 10 is pushed against the item to be printed 70, the printing surface 4 is moved to an area in front of the blowing ports 66a of the blower 66 to cause air from the blower 66 to impinge on the printing surface 4. It is desirable to set the blower 66 shown in FIG. 7 such that a range S where the blowing ports 66a are provided is larger than the width of the printing surface 4. The blower 66 shown in FIG. 7, for example, is configured such that air is supplied to the blower 66 from the inflow port 66b, and the blower 66 blows out air heated by the heater 67, which is disposed inside the blower 66, from the blowing ports 66a.

<Method for Producing Printed Item 70 with Printing Apparatus 100>

Figure 8:
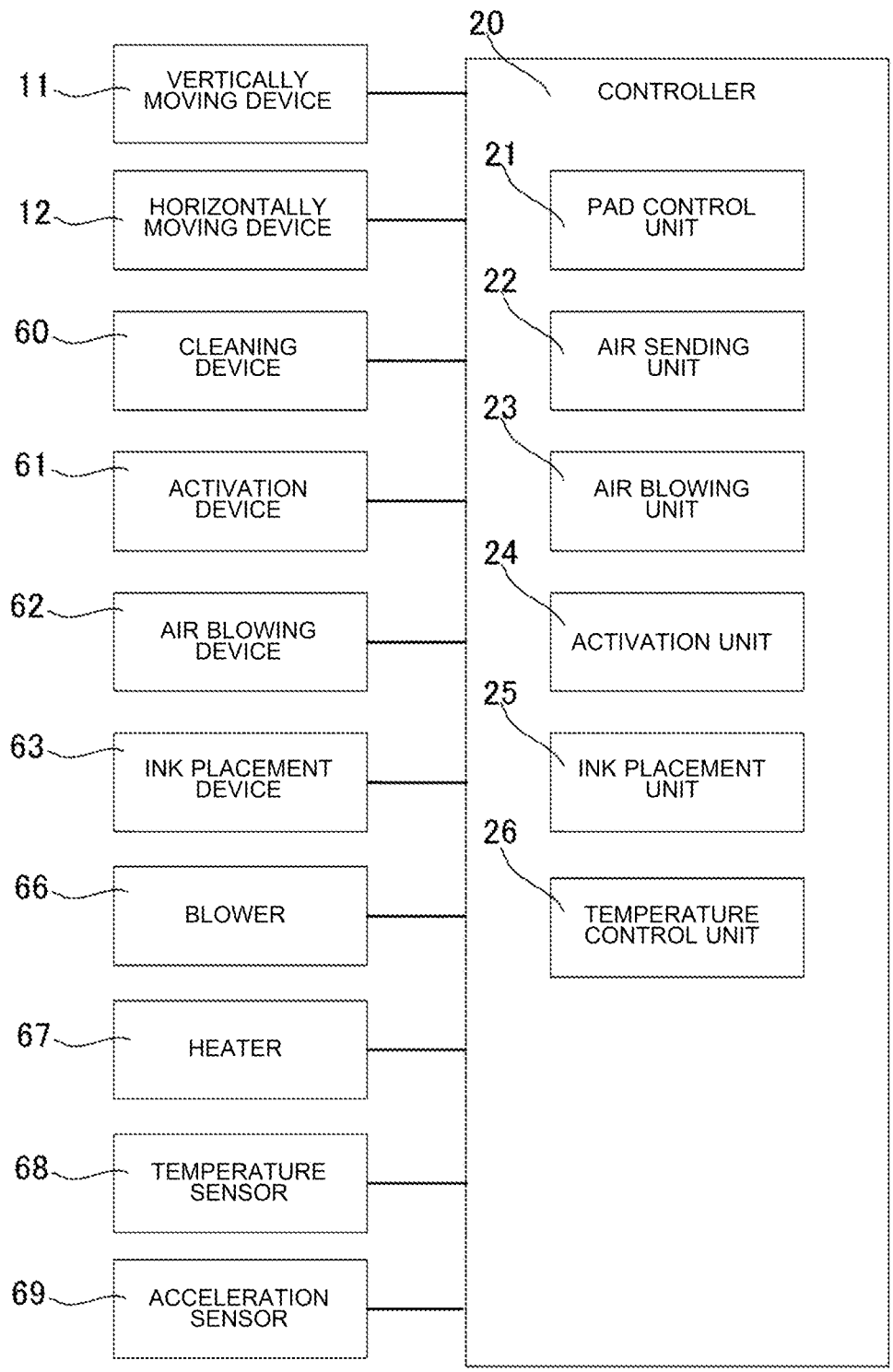
FIG. 8 shows one example of a functional block diagram of the printing apparatus 100 according to Embodiment 1.

FIG. 8 shows one example of a functional block diagram of the printing apparatus 100 according to Embodiment 1. Next, a method for producing a printed item with the printing apparatus 100 will be described. As shown in FIG. 1 and FIG. 8, the printing apparatus 100 includes a controller 20. The controller 20 may be a microcomputer, for example, and includes an arithmetic device 20a and a storage device 20b. The functions of the controller 20, which are represented by functional blocks shown in FIG. 8, are implemented by use of the arithmetic device 20a and the storage device 20b (see FIG. 1).

The storage device 20b may be a ROM or a RAM, for example, the ROM holding a program and data, for example, in advance, the RAM being provided for temporarily storing data in executing the program. As the storage device 20b, a nonvolatile or a volatile semiconductor memory is used, such as a flash memory, an erasable and programmable ROM (EPROM), and an electrically erasable and programmable ROM (EEPROM). Further, as the storage device 20b, for example, a detachable recording medium may be used, such as a magnetic disk, a flexible disk, an optical disc, a compact disc (CD), a mini disc (MD), and a digital versatile disc (DVD). The storage device 20b can store information obtained from the temperature sensor 68 or other sensors and information processed by the arithmetic device 20a.

The arithmetic device 20a is a device that performs various processes for executing the functions of the controller 20. The arithmetic device 20a compares information on the temperature of the room from the temperature sensor 68, for example, with the threshold of a temperature stored in the storage device 20b in advance to determine whether or not the temperature of the room is higher than the threshold. When the temperature of the room is higher than the threshold, the controller 20 exercises a control of limiting output from the heater 67 to a predetermined value. When the temperature of the room is higher than the threshold, the controller 20 may exercise a control of shortening an operation time period of the blowers 66. Alternatively, the controller 20 may exercise a control of restricting a time period during which the printing pad 10 remains stopped in front of the blowers 66 to receive air.

Figure 9:
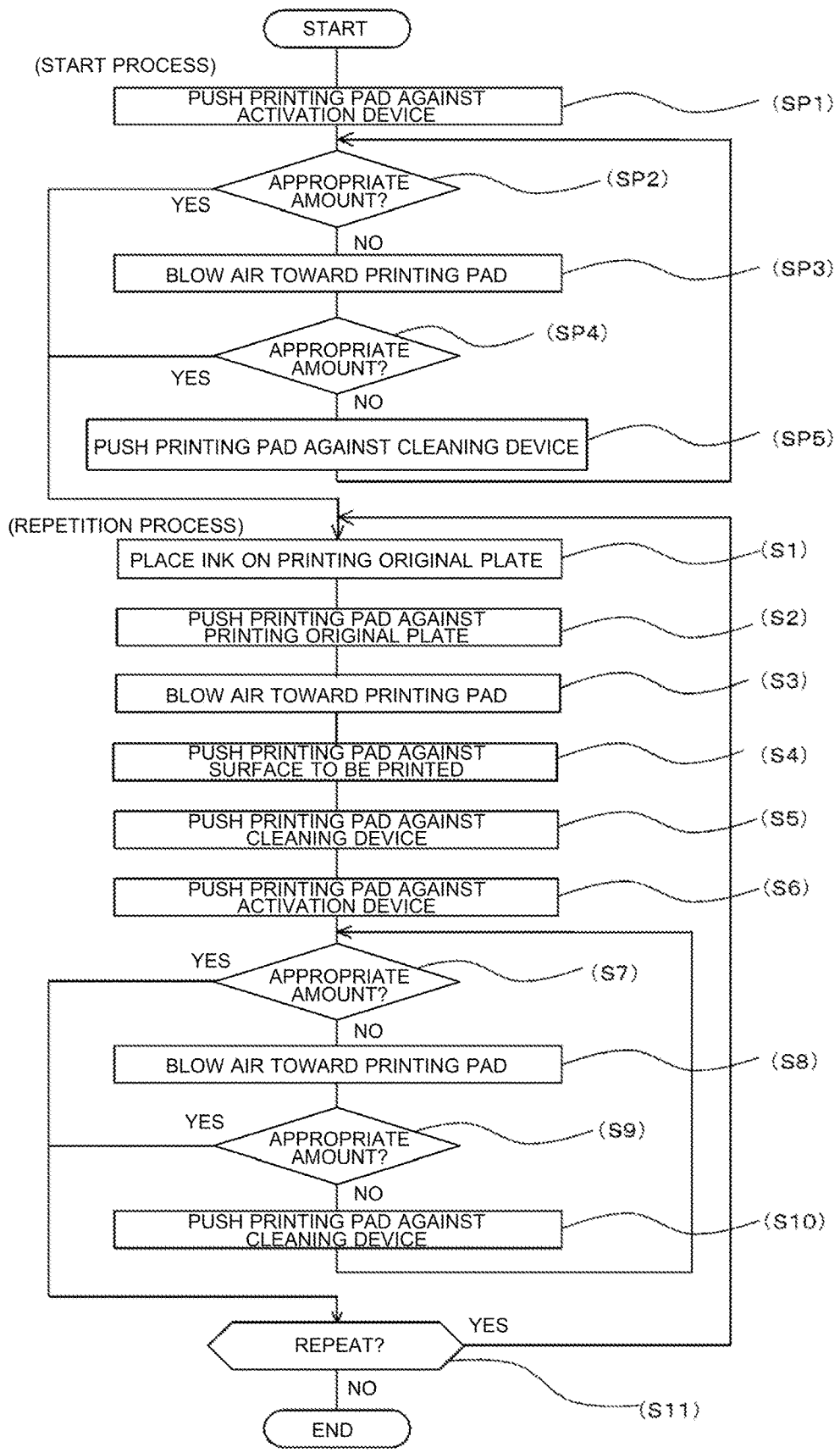
FIG. 9 is a flowchart of a method for producing a printed item 70 with the printing apparatus 100 according to Embodiment 1.

FIG. 9 is a flowchart of the method for producing the printed item 70 with the printing apparatus 100 according to Embodiment 1. The method for producing the printed item 70 with the printing apparatus 100 includes a start process and a repetition process, the start process being performed at the time of turning on the printing apparatus 100 or at the time of restarting the operation, a plurality of printed items 70 being produced in the repetition process. Whether the start process is performed depends on the state of the printing pad 10, and the start process may be omitted.

(Start Process)

The start process is a process performed immediately after the printing apparatus 100 is turned on, for example. Immediately after the production of the printed item 70 is started, there may be the case where the surface of the printing pad 10 is not activated. Therefore, a step of appropriately activating the printing surface 4 of the printing pad 10 is performed. The printing pad 10 is made of a material to which the hard ink 40 is less likely to adhere, such as silicone rubber, and hence, there may be a case where the ink 40 is not transferred as intended even when the printing pad 10, as is without any change, is pushed against the printing original plate 50. For this reason, the printing apparatus 100 according to Embodiment 1 activates the printing surface 4 in the start process as necessary.

First, after the printing apparatus 100 is turned on, the printing apparatus 100 causes the printing pad 10 to move to an area above the activation device 61 and, then, to move downward toward the activation device 61. After the printing surface 4 is pushed against the absorbing unit of the activation device 61, so that a predetermined range including the printing surface 4 comes into contact with the absorbing unit, the printing pad 10 is elevated. Such an operation is referred to as an activation step (SP1). By performing such a step, liquid, such as water and solvent, permeating into the absorbing unit of the activation device 61 adheres to or permeates into the printing surface 4 of the printing pad 10. Fine unevenness is formed on the surface of the printing surface 4, thus allowing the printing surface 4 to hold liquid from the absorbing unit when the liquid adheres to the surface of the printing surface 4. It is desirable that the unevenness be formed on the printing surface 4 with a height difference of 2 to 5 µm. A pad control unit 21 of the controller 20 controls the vertically moving device 11 and the horizontally moving device 12. Such a control controls the position of the printing pad 10, the movement of the printing pad 10 to the activation device 61 from a position of the printing pad 10 when the production is started, and an action of pushing the printing pad 10. An activation unit 24 exercises a control or makes a notification to cause an amount of liquid contained in the absorbing unit of the activation device 61 to be maintained at a predetermined amount. In the case where the absorbing unit deteriorates, the activation unit 24 exercises a control or makes a notification to renew the absorbing unit.

After the activation step (SP1) is completed, it is determined whether or not the amount of liquid adhering to the printing surface 4 of the printing pad 10 is appropriate (SP2). When the amount of the liquid adhering to the printing surface 4 is not appropriate (NO in SP2), the printing apparatus 100 performs an air blowing step (SP3). In the air blowing step, the air blowing device 62 blows air toward the printing surface 4 of the printing pad 10 to remove excess liquid adhering to the printing surface 4. The case where the amount of liquid adhering to the printing surface 4 is not appropriate means the case where the excessively large amount of liquid adheres to the printing surface 4. An air blowing unit 23 of the controller 20 is a unit that controls the operation of the air blowing device 62. The air blowing unit 23 drives the air blowing device 62 such that the air blowing step is performed when the printing pad 10 is moved to an area where air sent from the air blowing device 62 impinges on the printing pad 10.

After the air blowing step (SP3) is completed, it is determined whether or not the amount of liquid adhering to the printing surface 4 of the printing pad 10 is appropriate (SP4). When excess water or solvent still adheres to the printing surface 4 of the printing pad 10 (NO in SP4), the printing apparatus 100 performs an absorption step (SP5). In the absorption step, the printing apparatus 100 pushes the printing surface 4 of the printing pad 10 against the cleaning device 60. With such an operation, the excess liquid adhering to the printing surface 4 of the printing pad 10 is removed.

When the amount of water or solvent adhering to or permeating into the printing pad 10 is appropriate (YES in SP2 or YES in SP4), one or both of the air blowing step (SP3) and the absorption step (SP5) may be omitted. The order of performing the air blowing step and the absorption step may be changed. Further, the air blowing step and the absorption step may be performed a plurality of times. Whether or not the amount of liquid adhering to the printing surface 4 is appropriate may be visually checked by the operator. When the operator determines that excess liquid adheres to the printing surface 4, the operator may give an instruction to perform the absorption step, so that the pad control unit 21 of the controller 20 moves the printing pad 10 to perform at least one of the air blowing step and the absorption step.

(Repetition Process)

After the start process is completed, and the printing surface 4 of the printing pad 10 is appropriately activated, the process advances to the repetition process. The repetition process includes an ink placement step (S1), an ink transfer step (S2), an air sending step (S3), a printing step (S4), a cleaning step (S5), an activation step (S6), an air blowing step (S8), and an absorption step (S10). As shown in FIG. 9, the printing apparatus 100 performs the ink placement step (S1), the ink transfer step (S2), the air sending step (S3), the printing step (S4), the cleaning step (S5), the activation step (S6), the air blowing step (S8), and the absorption step (S10) in this order. However, the order of steps in the repetition process is not limited to such an order. For example, after the ink placement step (S1) and the ink transfer step (S2) are completed, the printing apparatus 100 performs steps from the air sending step (S3) to the absorption step (S10). However, the printing apparatus 100 may perform the ink placement step (S1) of the next cycle in parallel while performing the steps from the air sending step (S3) to the absorption step (S10).

In the repetition process, a print image is formed on the surface of the item to be printed 70 each time the printing step (S4) is performed. The number of items to be printed 70 is not limited to one, and printing may be performed on a plurality of items to be printed 70 simultaneously. In the case where the printing is performed on the plurality of items to be printed simultaneously, a plurality of printing pads 10 may be installed to the printing apparatus 100.

(Ink Placement Step)

The ink placement step (S1) is a step of placing the ink 40 on the printing original plate 50 with the ink placement device 63. The ink placement device 63 causes the ink holding unit 64 to rotate on the placement surface 51 of the printing original plate 50 with the ink holding unit 64 being in contact with the placement surface 51. The ink 40 absorbed by the ink holding unit 64 is placed only in the ink-philic region 58 provided on the placement surface 51. The ink holding unit 64 into which the ink 40 is absorbed also comes into contact with the ink-phobic region 57. However, the ink-phobic region 57 repels the ink 40, so that the ink 40 is not placed in the ink-phobic region 57. To allow the ink 40 to be repelled by the ink-phobic region 57, it is desirable to set a hard ink 40. For example, it is preferable to set the viscosity of the ink 40 to a range of 700 to 1200 P (Poise). An ink placement unit 25 of the controller 20 controls the action of the ink placement device 63 such that the ink 40 is placed on the printing original plate 50 before the printing pad 10 is pushed against the printing original plate 50.

(Ink Transfer Step)

In the ink transfer step (S2), the printing surface 4 of the printing pad 10 is pushed against the placement surface 51 of the printing original plate 50. The printing surface 4 of the printing pad 10 comes into contact with the ink 40 placed in the ink-philic region 58 of the printing original plate 50. Thereafter, the printing pad 10 moves upward, so that the printing surface 4 is separated from the placement surface 51 of the printing original plate 50. The ink 40, which comes into contact with the printing surface 4, directly moves to the printing surface 4. The ink 40 is disposed on the printing surface 4 to be suited to the ink-philic region 58 disposed on the placement surface 51 of the printing original plate 50. The action of pushing the printing pad 10 against the printing original plate 50 is also controlled by the pad control unit 21.

Water or solvent adheres to or permeates into the printing surface 4 of the printing pad 10 in the activation step (SP1 or S6), so that the ink 40 can easily adhere to the printing surface 4 of the printing pad 10. In particular, to obtain a print image with high accuracy, it is necessary to reduce the size per dot of the ink 40 transferred to the printing surface 4, and it is also necessary to reduce a distance between adjacent portions of the ink 40. Therefore, it is desirable to use the ink 40 with high viscosity. Specifically, as described above, it is desirable to set the viscosity of the ink 40 to a range of 700 P to 1200 P. In the printing apparatus 100, the printing surface 4 of the printing pad 10 is activated by the activation device 61, so that even the ink 40 with high viscosity can easily adhere to the printing surface 4 of the printing pad 10.

(Air Sending Step)

In the air sending step (S3), the printing pad 10 is moved to a position where air sent from the blowers 66 impinges on the printing surface 4. When the printing pad 10 is moved to a predetermined position, the operation of the blowers 66 is started, so that air is blown toward the printing surface 4. After the lapse of a predetermined time period from when air is blown toward the printing surface 4, an air sending unit 22 of the controller 20 may exercise a control of stopping the operation of the blowers 66, or may exercise a control of starting the movement of the printing pad 10 being in a stopped state. The temperature of air blown out from the blowers 66 is controlled to 40 to 80 degrees C., for example.

In the air sending step (S3), a time period during which air is blown toward the printing pad 10 may be controlled with reference to information on the temperature of surroundings in the room. The air sending unit 22 receives information on the temperature of the room from a temperature sensor 28, and controls the operation of the blower 66 such that an operation of blowing air is performed for a time period of a length that is set for the temperature of the room. For example, when the temperature of the room is high, the air sending unit 22 exercises a control of shortening the time period during which air is blown, for example.

The air sending unit 22 may also adjust the length of the time period, during which air is blown, with reference to information from a temperature control unit 26 that controls output from the heater 67 incorporated in each blower 66. Specifically, on the basis of information on the temperature of air blown out from the blowers 66, the air sending unit 22 controls the amount of air to be blown, the temperature of the air being measured by the temperature sensor 68. It is preferable to adjust the viscosity of the ink 40 on the printing surface 4 to a range of 900 P or more and 1100 P or less, for example, by blowing air. However, the viscosity of ink is not limited to the viscosity described above.

(Printing Step)

In the printing step (S4), the printing surface 4 of the printing pad 10 with the ink 40 adhering to the printing surface 4 is pushed against the item to be printed 70. The printing apparatus 100 according to Embodiment 1 can print on a flat surface, and can also print on the surfaces to be printed 71, 72, and 73 of the item to be printed 70 as shown in FIG. 3 and FIG. 4. The surface to be printed 71 of the item to be printed 70 is a flat surface. However, the surface to be printed 72 is a curved surface, and the surface to be printed 73 is a flat surface, but is a surface inclined to a direction along which the printing pad 10 moves. In the printing step (S4), the printing pad 10 is pushed toward the printing stage 87 such that the printing surface 4 to which the ink 40 adheres is brought into close contact with the surfaces to be printed 71, 72, and 73. The ink 40 adhering to the printing surface 4 comes into contact with and is transferred to the surfaces to be printed 71, 72, and 73. The movement of the printing pad 10 in the printing step is also controlled by the pad control unit 21.

The item to be printed 70 is positioned and fixed on the printing stage 87. With such a configuration, the positional relationship between the printing pad 10 and the surfaces to be printed 71, 72, and 73 is determined, so that the printing can be performed on the surfaces to be printed 71, 72, and 73 with high accuracy.

(Cleaning Step)

In the cleaning step (S5), the printing surface 4 of the printing pad 10 after the ink 40 is transferred to the surfaces to be printed 71, 72, and 73 is pushed against a flat cleaning surface of the cleaning device 60. The ink 40 remaining on the printing pad 10 is caused to adhere to the cleaning surface. The cleaning surface is a piece of paper or an adhesive tape. However, the material of the cleaning surface is not limited to the above.

(Activation Step, Air Blowing Step, Absorption Step)

The activation step (S6) is a step substantially equal to the activation step (SP1) in the start process. The air blowing step (S8) is a step substantially equal to the air blowing step (SP3) in the start process. The absorption step (S10) is also a step substantially equal to the absorption step (SP5) in the start process. The air blowing step (S8) and the absorption step (S10) are performed corresponding to the amount of liquid, such as water and solvent, adhering to the printing surface 4 of the printing pad 10. Either one of the air blowing step (S8) or the absorption step (S10) may be omitted, or at least one of the air blowing step (S8) and the absorption step (S10) may be performed a plurality of times. Each of the air blowing step (S8) and the absorption step (S10) is a step that is performed corresponding to the activation state of the printing surface 4 of the printing pad 10 after the state of the printing surface 4 is checked (S7 and S9) before the air blowing step (S8) or the absorption step (S10) is performed.

When printing is performed on the next item to be printed 70 after it is determined in S7 or S9 that the printing surface 4 is in a state appropriate for transferring the ink 40, the flow returns to S1 again. When the production of the item to be printed 70 ends, the flow ends (S11). As described above, the printing apparatus 100 is an apparatus that performs the start process when the printing apparatus 100 is turned on, and that performs the repetition process thereafter to perform printing on a large number of items to be printed 70.

In the case where the printing original plate 50 is formed by the plurality of single color printing original plates 50, for example, the printing may be performed by use of the plurality of printing apparatuses 100 that correspond to the plurality of single color printing original plates 50. For example, one printing apparatus 100 includes a single color printing original plate 50, and performs printing on the item to be printed 70 by use of only magenta ink. Thereafter, the printing is performed on the item to be printed 70 by use of only cyan ink by another printing apparatus 100 including a single color printing original plate 50. Printing can be performed by repeating such operations by the number of times equal to the number of the plurality of single color printing original plates 50.

In the case where the printing apparatus 100 includes a plurality of printing original plate stages 85 and a plurality of ink placement devices 63 corresponding to the plurality of single color printing original plates 50, the printing apparatus 100 repeatedly perform at least the ink placement step, the ink transfer step, and the printing step on one item to be printed 70 by the number of times equal to the number of the plurality of single color printing original plates 50. The printing apparatus 100 may repeatedly perform at least one of the cleaning step, the activation step, the air blowing step, and the absorption step by the number of times equal to the number of the plurality of single color printing original plates 50.

The method for producing the printed item 70 with the printing apparatus 100 has been described above. However, the production method is not limited to the above, and each step may be changed to be suited to a given use.

Advantageous Effect of Embodiment 1

The printing pad 10 according to Embodiment 1 includes the printing surface 4 located on the surface of the printing pad 10 to be pushed against a printing original plate and the surfaces to be printed 71, 72 and 73, the printing original plate having ink placed on the printing original plate, the surfaces to be printed 71, 72 and 73 being objects to be printed, the inner layer 1 disposed inside the printing pad 10, and the outer layer 2 provided in contact with the surface of the inner layer 1 that is closer to where the printing surface 4 is disposed than is an opposite surface of the inner layer 1. The outer layer 2 is formed such that the printing surface 4 is brought into close contact with the surfaces to be printed 71, 72 and 73 to conform to the surfaces to be printed 71, 72 and 73 when the outer layer 2 is pushed against the surfaces to be printed 71, 72 and 73, and the inner layer 1 has cavities provided in the inner layer 1.

With such a configuration, the inner layer 1 has the cavities and hence, in the printing pad 10, a reduction in weight can be achieved. Further, the printing pad 10 is formed such that the outer layer 2 is deformed to conform to the shapes of the surfaces to be printed 71, 72 and 73 of the item to be printed 70, thus allowing printing on the item to be printed 70 having unevenness. Therefore, the printing pad 10 allows print on the item to be printed 70 having a complicated surface to be printed while a reduction in weight of the printing pad 10 can be achieved. Further, in the printing pad 10, a reduction in the amount of an elastic material forming the outer layer 2 can be achieved by an amount corresponding to the inner layer 1.

Each of the inner layer 1 and the outer layer 2 is fixed to the support part 7 at a first end portion that is opposite to a second end portion that is closer to where the printing surface 4 is disposed than is the first end portion. With such a configuration, the printing apparatus 100 causes the outer layer 2 to be deformed by applying a load to the outer layer 2 via the support part 7 and the inner layer 1 and hence, it is possible to cause the outer layer 2 to be deformed such that the printing surface 4 conforms also to inclined surfaces, such as the surfaces to be printed 72 and 73.

If printing is performed with a printing pad 10 having no inner layer 1, that is, if printing is performed with a printing pad 10 having a space at a portion where the inner layer 1 is disposed, the outer layer 2 will deform to bulge in the horizontal direction, so that the printing surface 4 is not brought into close contact with the surface to be printed 73. Further, the outer layer 2 can also be deformed in a direction along which a space is reduced where the inner layer 1 is normally disposed and hence, of the printing surface 4, a peripheral portion that is far from the apex 6 is less easily to be pushed toward the upper surface of the printing stage 87. However, in the printing pad 10 according to Embodiment 1, the inner layer 1 is made of a material that is less likely to be deformed and hence, inward deformation of the outer layer 2 is limited. Further, the outer layer 2 is fixed to the surface of the inner layer 1 and hence, deformation of the outer layer 2 such that the outer layer 2 bulges outward is limited. Accordingly, the printing surface 4 can also easily conform to the surfaces to be printed 72 and 73.

The inner layer 1 of the printing pad 10 is made of plastic foam, for example. With such a configuration, even when the printing pad 10 is pushed against the item to be printed 70, the deformation of the inner layer 1 is limited, and a load from the printing apparatus 100 can be easily transferred to the outer layer 2. Further, the inner layer 1 has higher rigidity than does the outer layer 2 and hence, it is possible to achieve a reduction in weight of the printing pad 10 while only the outer layer 2 is efficiently deformed. In particular, the outer layer 2 is made of soft silicone rubber, for example, and hence, the outer layer 2 is heavy and requires a relatively high material cost. However, it is possible to reduce the amount of silicone rubber by an amount corresponding to the volume of the inner layer 1 and hence, the printing pad 10 has an advantage that weight can be reduced and costs can also be reduced as a whole.

It is preferable that the volume of the inner layer 1 including cavities be 30% or less of a total of the volume of the outer layer 2 and the volume of the inner layer 1 including cavities. With such a configuration, the outer layer 2 can conform to the item to be printed 70 even when the item to be printed 70 has a complicated uneven shape. For example, the height dimension of the printing pad 10 is determined on the basis of a dimension H of the protruding portion of the item to be printed 70. With such a configuration, when the volume of the inner layer 1 is 30% of the total of the volume of the outer layer 2 and the volume of the inner layer 1 including cavities, approximately half of the thickness of the printing pad 10 is made up of the outer layer 2 and hence, the printing surface 4 can conform to the surfaces to be printed 72 and 73. Further, the surface of the inner layer 1 that is closer to where the printing surface 4 is disposed than is an opposite surface of the inner layer 1 has a shape similar to the shape of the surface of the outer layer 2 that is closer to where the printing surface 4 is disposed than is an opposite surface of the outer layer 2 and hence, the outer layer 2 has a uniform thickness along the printing surface 4. Therefore, the outer layer 2 is uniformly deformed, and can also easily conform to the surfaces to be printed 72 and 73. However, the shape of the inner layer 1 is not limited to only the shape similar to the shape of the surface of the outer layer 2.

The printing apparatus 100 according to Embodiment 1 also includes the printing pad 10, the printing original plate stage 85, the printing stage 87, and the blowers 66, the printing pad 10 having the printing surface 4, the printing original plate 50 being placed on the printing original plate stage 85 and having the ink-phobic region 57 and the ink-philic region 58 on the placement surface 51 on which the ink 40 is placed, the ink-phobic region 57 accepting no ink 40, the ink-philic region 58 accepting the ink 40, the printing stage 87 being provided for placing the item to be printed 70, the blowers 66 being configured to send air toward the printing surface 4 of the printing pad 10. The printing pad 10 is to be movable between the printing original plate stage 85 and the printing stage 87, and is to be vertically movable from and to the printing original plate stage 85 or the printing stage 87. The blowers 66 send air toward the printing surface 4 of the printing pad 10 in a state where the ink 40 on the placement surface 51 of the printing original plate 50 is transferred to the printing surface 4.

With the above-mentioned configuration, immediately before the ink 40 is transferred to the item to be printed 70, the printing apparatus 100 can evaporate liquid adhering to or permeating into the printing surface 4 of the printing pad 10. Therefore, liquid, such as water and solvent, adheres to the printing surface 4 in the activation step, thus bringing the printing surface 4 in a state where the ink 40 relatively easily adheres to the printing surface 4. However, an affinity of the printing surface 4 for the ink 40 is limited immediately before the printing surface 4 is pushed against the item to be printed 70. Accordingly, even in the case where slippage occurs between the surfaces to be printed 71, 72 and 73 and the printing surface 4, the ink 40 is in a state of being less likely to adhere to the printing surface 4 and hence, it is possible to limit the deformation or the movement of the ink 40 after the ink 40 adheres to the surfaces to be printed 71, 72 and 73. The slippage means that the printing surface 4 is displaced in a direction along the surfaces to be printed 71, 72 and 73 in a state where the printing surface 4 is pushed against the surfaces to be printed 71, 72 and 73.

Figure 10:
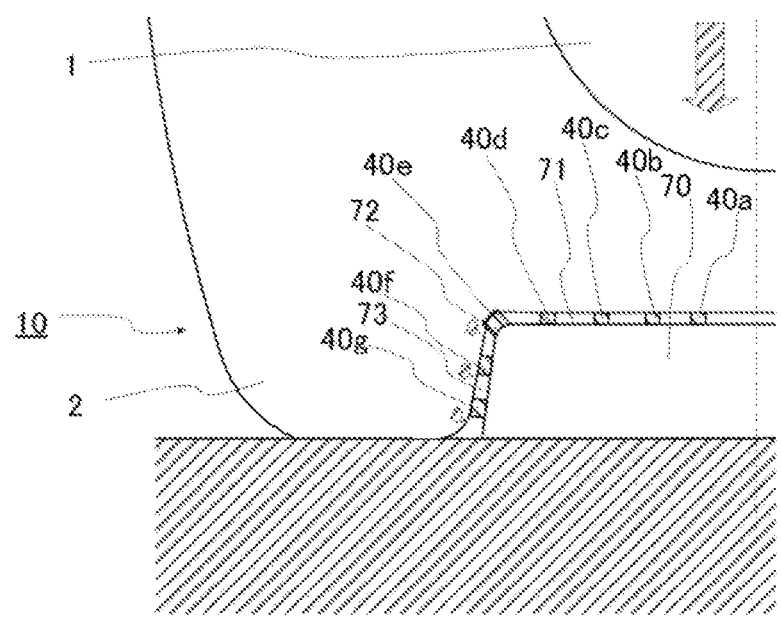
FIG. 10 is an enlarged view of a contact portion between a printing surface 4 and surfaces to be printed 71, 72, and 73 shown in FIG. 4.
Figure 11:
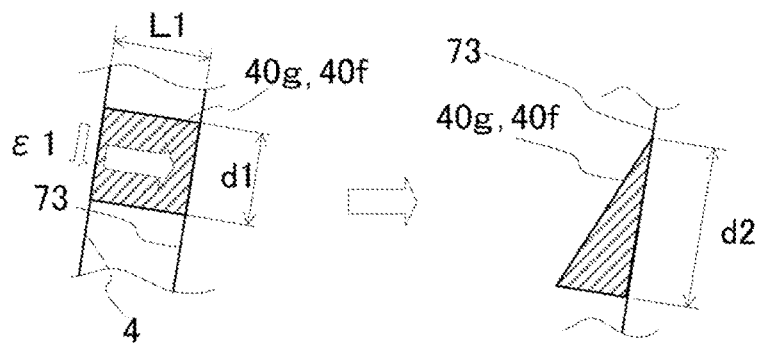
FIG. 11 is an enlarged view of ink 40f or 40g to be transferred to the surface to be printed 73 shown in FIG. 10.

FIG. 10 is an enlarged view of a contact portion between the printing surface 4 and the surfaces to be printed 71, 72, and 73 shown in FIG. 4. FIG. 11 is an enlarged view of ink 40f or 40g to be transferred to the surface to be printed 73 shown in FIG. 10. In FIG. 10 and FIG. 11, portions of the printing pad 10 and the deformation of inks 40a to 40g are schematically shown, and do not limit the structure and material of the printing pad 10 and the configuration of the printing apparatus 100. A diagram on the left in FIG. 11 shows the ink 40 in a state where the printing pad 10 is pushed against the item to be printed 70. A diagram on the right in FIG. 11 shows a state where the ink 40f or 40g is transferred to the surface of the item to be printed 70. There may be a case where the printing apparatus 100 according to Embodiment 1 transfers the ink 40 to a curved surface or a surface inclined to a direction along which the printing pad 10 moves, such as the surfaces to be printed 72 and 73. The inks 40a to 40g transferred from the printing original plate 50 are placed on the printing surface 4 of the printing pad 10. The inks 40a to 40d are transferred to the surface to be printed 71, which is perpendicular to the direction along which the printing pad 10 moves. The ink 40e is transferred to the surface to be printed 72, which is a curved surface. The inks 40f and 40g are transferred to the surface to be printed 73, which is a surface inclined to a surface perpendicular to the direction along which the printing pad 10 moves. The surfaces to be printed 71, 72, and 73 of the item to be printed 70 are merely an example, and the item to be printed 70 may have another uneven shape.

The printing pad 10 is deformed such that the printing surface 4 conforms to the surfaces to be printed 72 and 73 having an uneven shape. At this point of operation, the printing surface 4 is displaced slightly in directions along the surfaces to be printed 72 and 73. Therefore, as shown in FIG. 11, the inks 40f and 40g, which come into contact with both the printing surface 4 and the surface to be printed 73, are transferred while slipping in a direction along the surface to be printed 73 corresponding to a strain 81 of the printing surface 4. The ink 40 and the surface to be printed 73 come into contact with each other in a state where the printing surface 4 and the surface to be printed 73 are separated from each other by a distance L1. The printing surface 4 continues to be deformed during a period during which the printing pad 10 is pushed against the item to be printed 70, thus being compressed. Therefore, the inks 40f and 40g are deformed between the printing surface 4 and the surface to be printed 73 during the period from a contact of the inks 40f and 40g with the surface to be printed 73 until the end of the deformation of the printing pad 10. For this reason, after the inks 40f and 40g having a width d1 in an original state are transferred to the surface to be printed 73, the inks 40f and 40g have a width d2. At this point of operation, because of the strain 81, during the period from the contact of the inks 40f and 40g with the surface to be printed 73 until the end of the deformation of the printing pad 10, the inks 40f and 40g satisfy $d2=d1 \cdot \varepsilon 1$. In this state, $\varepsilon 1 > 1$. In the case where the amount of deformation of the printing pad 10 is large, the deformation of the inks 40f and 40g shown in FIG. 11 may occur in any one of the inks 40a to 40f. In the description made hereinafter, there may be a case where the inks 40a to 40f are collectively referred to as the ink 40.

In Embodiment 1, the ink 40 is cured when air is sent to the surface of the printing surface 4, so that an affinity between the printing surface 4 and the ink 40 is reduced. Accordingly, even when the printing surface 4 is deformed to slip in the direction along the surface to be printed 73 in the diagram on the left in FIG. 11, the ink 40 is in a cured state and hence, distortion and slippage of the ink 40 are limited, so that the ink 40 is less likely to be affected by the deformation of the printing surface 4. Therefore, the width d2 shown in the diagram on the right in FIG. 11 is limited to a small value. That is, in printing performed with the printing apparatus 100 according to Embodiment 1, a difference between the width d1 and the width d2 in FIG. 11 is limited to a small value even when the printing pad 10 has the strain ε1. Further, in the diagram on the right in FIG. 11, the shape of the ink 40 is deformed into a triangular shape. However, in the printing performed with the printing apparatus 100 according to Embodiment 1, the ink 40 is cured before being transferred to the surface to be printed 73 and hence, it is also possible to limit the deformation of the ink 40.

That is, as shown in FIG. 3 and other drawings, the item to be printed 70 includes the surfaces to be printed 72 and 73 inclined to a direction along which the printing pad 10 is pushed, and the ink 40 is transferred also to the surfaces to be printed 72 and 73 by pushing the printing surface 4 against the surfaces to be printed 72 and 73. At this point of operation, the printing pad 10 is pushed to such an extent that the printing pad 10 is deformed along the surfaces to be printed 72 and 73, and is brought into close contact with the surfaces to be printed 72, 73 and the upper surface of the printing stage 87. The printing pad 10 is made of a material that can be easily deformed, and is made of silicone rubber, for example. In the case where the item to be printed 70 has a large uneven shape or a complicated shape, the printing pad 10 has a larger amount of deformation when the printing pad 10 is pushed against the item to be printed 70 than an amount of deformation when the printing pad 10 is pushed against the printing original plate 50 and hence, there may be a case where the printing surface 4 is partially stretched or compressed. In such a case, slippage occurs between the surface to be printed 71, 72 or 73 and the printing surface 4.

Immediately after the activation step, liquid adheres to or permeates into the printing surface 4, so that the printing surface 4 is in a state of having a high affinity for the ink 40. Therefore, the printing surface 4 is in a state where the ink 40 easily adheres to the printing surface 4 from the printing original plate 50.

In the case where the printing surface 4 is pushed against the item to be printed 70 in a state where the ink 40 easily adheres to the printing surface 4 as described above, the ink 40 adheres to the surface to be printed 71, 72 or 73, and the ink 40 relatively easily adheres also to the printing surface 4. Therefore, when the ink 40 is brought into a state of being brought into contact with both the printing surface 4 and the item to be printed 70, the printing surface 4 causes the ink 40 adhering to the item to be printed 70 to be deformed or moved. In particular, on the surfaces to be printed 72 and 73 where slippage between the printing surface 4 and the surface of the item to be printed 70 relatively easily occurs, there may be a case where the ink 40 transferred as described with reference to FIG. 11 is deformed in a direction along the surface of the item to be printed 70. Alternatively, there may also be a case where the printing surface 4 causes the ink 40 to be moved from a position where the ink 40 comes into contact with the surface of the item to be printed 70 first. In such a case, a situation occurs where the ink 40 is not disposed on the surface of the item to be printed 70 at the expected position with the expected shape and hence, there may be a case where accuracy in a print image is reduced.

However, as described above, with the printing apparatus 100 according to Embodiment 1, air is blown toward the printing surface 4 before the printing surface 4 is pushed against the item to be printed 70 and hence, the ink 40 is cured, thus being less likely to be distorted and slip, leading to a state where an affinity between the printing surface 4 and the ink 40 is reduced. Therefore, when the printing surface 4 is pushed against the item to be printed 70, the ink 40 can be easily separated from the printing surface 4. Even in the case where slippage occurs between the printing surface 4 and the surfaces to be printed 71, 72 and 73, it is possible to limit the deformation or the movement of the ink 40 caused by the movement of the printing surface 4 due to slippage. That is, the ink 40 is cured, thus being less likely to be distorted and slip and hence, at the point of time when the ink 40 is brought into contact with the surface to be printed 71, 72 or 73, the ink 40 remains at a position where the ink 40 adheres to the surface to be printed 71, 72 or 73 even when the printing surface 4 slips. The ink 40 is hardened, so that an affinity between the ink 40 and the printing surface 4 is low. Accordingly, after the ink 40 adheres to the surface to be printed 71, 72 or 73, the ink 40 slips against the surface of the printing surface 4 even when the printing surface 4 moves due to slippage and hence, it is possible to limit the movement of the ink 40 from a position where the ink 40 adheres to the surface to be printed 71, 72 or 73.

Further, when air is blown toward the printing surface 4, water or solvent permeating the ink 40 evaporates, so that the viscosity of the ink 40 increases. That is, the ink 40 becomes relatively hard in a state of adhering to the printing surface 4. With such a configuration, at the point of time when the ink 40 is transferred to the surfaces to be printed 71, 72 and 73 from the printing surface 4, the ink 40 is relatively hard and hence, it is possible to limit the deformation of the ink 40 caused by slippage of the printing surface 4.

As described above, with the printing apparatus 100, it is possible to limit the deformation and the movement of the ink 40 when the printing surface 4 is displaced along the surfaces to be printed 71, 72 and 73 after the ink 40 is brought into contact with the surfaces to be printed 71, 72 and 73. As described with reference to FIG. 11, with less ink 40, the deformation and the movement of the ink 40 can be more limited. Accordingly, the printing apparatus 100 uses both the printing pad 10 and the printing original plate 50 described above and sending air by the blowers 66, thus achieving printing with higher accuracy.

Figure 12:
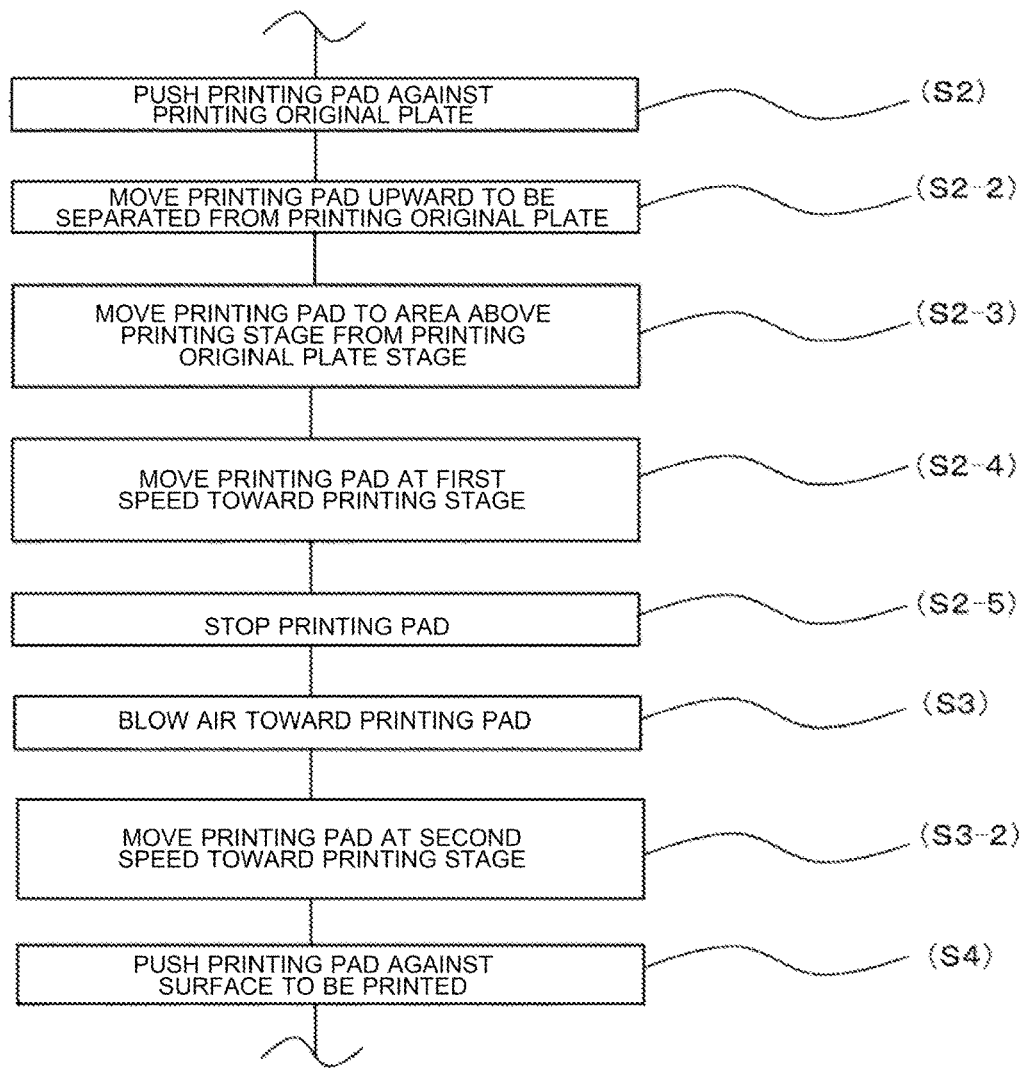
FIG. 12 shows a modification of steps, which is from a step in which the printing pad 10 receives ink 40 from the printing original plate 50 to a step in which the printing pad 10 is pushed against the item to be printed 70, in the flowchart of the method for producing the printed item 70 with the printing apparatus 100 according to Embodiment 1.

FIG. 12 shows a modification of steps, which is from a step in which the printing pad 10 receives the ink 40 from the printing original plate 50 to a step in which the printing pad 10 is pushed against the item to be printed 70, in the flowchart of the method for producing the printed item 70 with the printing apparatus 100 according to Embodiment 1. The printing pad 10 is pushed against the printing original plate 50 and, thereafter, is moved to the printing stage 87 on which the item to be printed 70 is placed, and the printing pad 10 is then pushed against the item to be printed 70. During such operations, air is blown toward the printing surface 4 of the printing pad 10 from the blowers 66 and 66A and, then, the printing surface 4 of the printing pad 10 is pushed against the item to be printed 70. FIG. 10 shows the detail of the flow of control relating to the movement of the printing pad 10 during such operations.

(Ink Transfer Step)

In the ink transfer step (S2), the printing surface 4 of the printing pad 10 is pushed against the placement surface 51 of the printing original plate 50. Next, the printing pad 10 moves upward to be separated from the printing original plate 50 (S2-2). Then, the printing pad 10 is moved to an area above the printing stage 87 from the printing original plate stage 85 (S2-3). The above-mentioned steps are basically equal to the corresponding steps in Embodiment 1.

(Printing Step)

The printing pad 10, which is moved to the area above the printing stage 87, moves at a first speed toward the item to be printed 70 placed on the printing stage 87. The first speed is a speed that is set by taking into account that a time period required for the printing step is reduced as much as possible (S2-4). The pad control unit 21 controls the speed of the printing pad 10 in accordance with the specifications of the printing pad 10, such as a size and hardness.

The printing pad 10 moving at the first speed is stopped at a predetermined position separated from the item to be printed 70 (S2-5). This step is a step performed for stopping the printing pad 10 to cause air from the blowers 66 to impinge on the printing surface 4 for the next air sending step (S3), and for limiting vibration of the printing pad 10, which is made of a soft material, caused by the movement of the printing pad 10 at the first speed. The pad control unit 21 controls a time period during which the printing pad 10 remains stopped, on the basis of the size and hardness of the printing pad 10, the setting of the first speed, and information on printing, for example.

After or simultaneously with stopping of the printing pad 10, the blowers 66 send air to the printing surface 4 of the printing pad 10 (S3). This step is substantially equal to the corresponding step in Embodiment 1.

Next, the printing pad 10 is moved at a second speed (S3-2). At the point of time when sending of air is completed, the pad control unit 21 causes the printing pad 10 to move toward the printing stage 87 on which the item to be printed 70 is placed. The second speed is set to be lower than the first speed. The pad control unit 21 may exercise a control such that the speed of the printing pad 10 is gradually increased until the speed reaches the second speed. Alternatively, the pad control unit 21 may receive a signal from an acceleration sensor 69 (see FIG. 8) that detects vibration of the printing pad 10, for example, and may exercise a control such that the movement of the printing pad 10 is started at the point of time when acceleration caused by vibration becomes a predetermined value or less. The movement of the printing pad 10 may also be started in response to the instruction from the operator.

The printing pad 10, which moves at the second speed, is pushed against the surfaces to be printed 71, 72 and 73 of the item to be printed 70. The pad control unit 21 may cause the printing pad 10 to be pushed against the item to be printed 70 while the second speed is maintained, or the speed is reduced to a lower speed.

In the steps according to the above-mentioned modification, the printing apparatus 100 includes the pad control unit 21 that can control the printing pad 10, when the printing pad 10 is caused to move toward the item to be printed 70 placed on the printing stage 87, into at least two states, which is a movement state at the first speed and a stopped state. The stopped state is brought about at least before the printing pad 10 is brought into contact with the surfaces to be printed 71, 72 and 73. After the lapse of a predetermined time period from when the printing pad 10 is brought into the stopped state, the printing pad 10 moves toward the item to be printed 70. With such a configuration, the printing pad 10 is stopped during a period during which air is sent by the blowers 66, so that vibration can be limited and hence, it is possible to limit a reduction in accuracy in a print image when the ink 40 is transferred to the item to be printed 70.

The printing pad 10 is controlled such that the printing pad 10 moves at the second speed, which is lower than the first speed, immediately before the printing pad 10 is pushed against the item to be printed 70, and the printing pad 10 is then pushed against the item to be printed 70. Therefore, vibration of the printing pad 10 can be limited because of the movement at the second speed and hence, it is possible to limit a reduction in accuracy in a print image. Further, the printing pad 10 is deformed at a relatively low speed and hence, it is possible to limit the rapid deformation of the printing surface 4.

Air is sent by the blowers 66 during a time period during which the printing pad 10 remains stopped to limit vibration of the printing pad 10 and hence, it is possible to shorten a time period required for printing while an influence of the deformation and the movement of the ink 40 is limited.

(Modification of Control of Movement of Printing Pad 10)

In FIG. 12, the blowers 66 send air after or simultaneously with stopping of the printing pad 10. However, the blowers 66 may send air before the printing pad 10 is stopped. That is, in the flow shown in FIG. 12, step S3 may be immediately before step S2-3 or immediately before step S2-4. The blowers 66 may start to send air immediately before the printing pad 10 arrives at an area above the printing stage 87, or may start to send air simultaneously with or immediately after arrival of the printing pad 10 at the area above the printing stage 87. By sending air while the printing pad 10 moves, a time period during which the printing pad 10 remains stopped can be omitted and hence, it is possible to shorten a time period required for printing.

In the flow shown in FIG. 12, step S2-5 of stopping the printing pad 10 may be omitted. In this case, a configuration may be adopted where the first speed and the second speed are set to the same speed, and the blowers 66 send air to the printing surface 4 for a portion of the time period or for the entire time period during which the printing pad 10 is moving.

The printing apparatus 100 may be provided with the blower 66A that sends air to the printing surface 4 in the course of the movement of the printing pad 10 from the printing original plate stage 85 to the printing stage 87. The blower 66A may be provided independently from the printing original plate stage 85, the surface treatment stage 86, and the printing stage 87. Further, the blower 66A may be configured to move together with the printing pad 10. In this case, air can be sent to the printing surface 4 during the movement from the printing original plate stage 85 to the printing stage 87 and hence, such a configuration can contribute to the shortening of a time period required for printing.

(Modification of Printing Pad 10)

Figure 15:
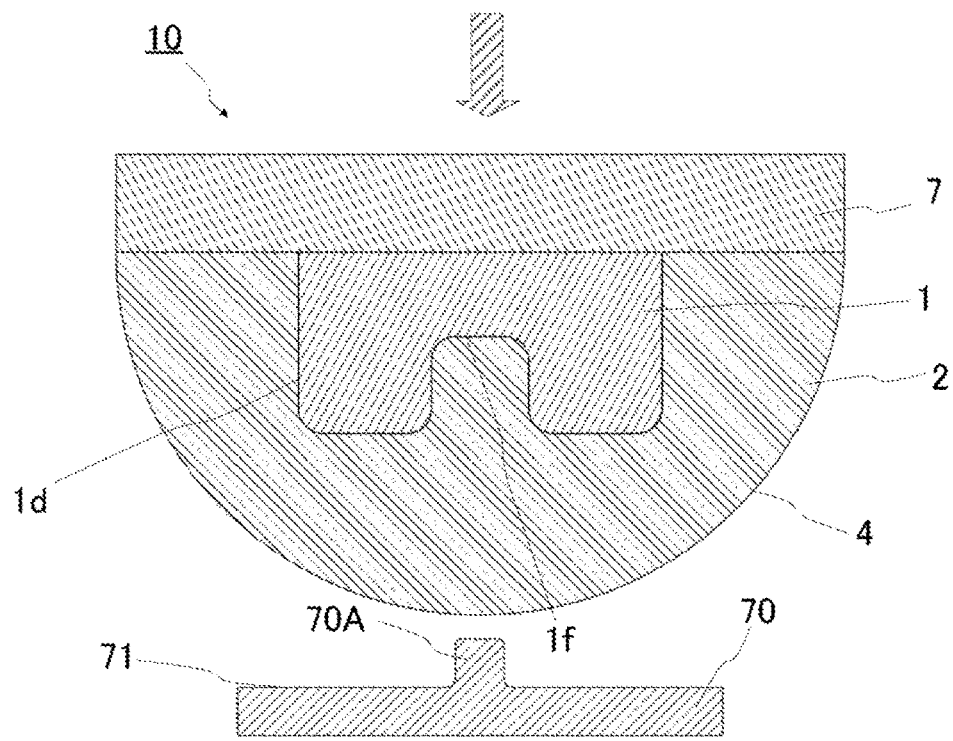
FIG. 15 is a cross-sectional view of a modification of the printing pad 10 according to Embodiment 1.
Figure 16:
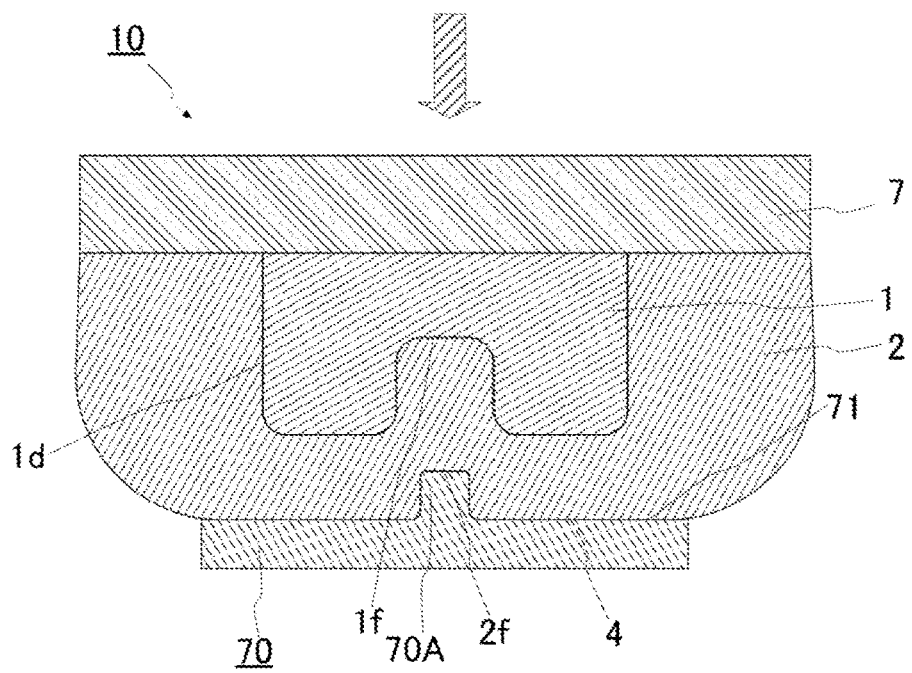
FIG. 16 is a cross-sectional view of the printing pad 10 shown in FIG. 15 in a state where the printing pad 10 is pushed against the item to be printed 70.

FIG. 15 is a cross-sectional view of a modification of the printing pad 10 according to Embodiment 1. FIG. 16 is a cross-sectional view of the printing pad 10 shown in FIG. 15 in a state where the printing pad 10 is pushed against the item to be printed 70. The form of the inner layer 1 of the printing pad 10 is not limited to only a form similar to the surface of the outer layer 2 shown in FIG. 2 and FIG. 3. As shown in FIG. 15, an outer surface 1d of the inner layer 1 may have a shape different from the shape of the surface of the outer layer 2 and may have a shape conforming to the shape of the item to be printed 70. In the printing pad 10 shown in FIG. 15 and FIG. 16, the surface of the inner layer 1 has a recessed portion 1f conforming to a protrusion 70A provided on the item to be printed 70.

As shown in FIG. 16, it is preferable that the outer surface 1d be formed on the basis of a state where the printing pad 10 is pushed against the item to be printed 70. That is, it is preferable that the outer surface 1d of the inner layer 1 have a shape similar to the shape of the surface of the outer layer 2 in a state of being pushed against the item to be printed 70. In other words, the outer surface 1d of the inner layer 1 has the recessed portion 1f, which corresponds to the protrusion 70A provided on the surface to be printed 71 of the item to be printed 70. That is, the shape of the surface of the inner layer 1 is similar to the shape of the surface of the outer layer 2 in a state of the printing surface 4 being pushed against the surface to be printed 71. The recessed portion 1f provided in the surface of the inner layer 1 is formed at a position that corresponds to a recessed shape 2f that is the shape of the surface of the outer layer 2 in a state of being pushed against the surface to be printed 71.

In the printing pad 10 according to the modification, in a state where the printing surface 4 is pushed against the item to be printed 70, the protrusion 70A and the recessed portion 1f are arranged in a direction along which the printing pad 10 is pushed and, in a state where the outer layer 2 is deformed, the surface of the outer layer 2 and the surface of the outer layer 2 that is in contact with the inner layer 1 have a substantially similar shape. With such a configuration, a load applied to the item to be printed 70 from the printing pad 10 is averaged at each portion of the surface to be printed 71.

Figure 17:
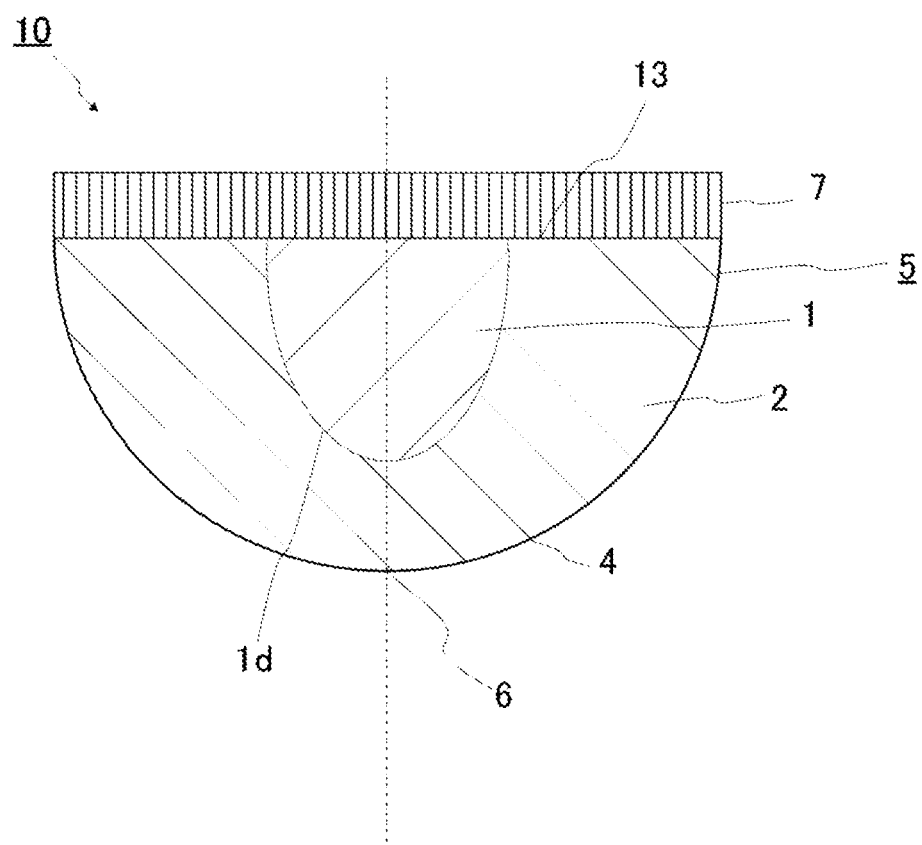
FIG. 17 is a cross-sectional view of a modification of the printing pad 10 according to Embodiment 1.

FIG. 17 is a cross-sectional view of a modification of the printing pad 10 according to Embodiment 1. The inner layer 1 of the printing pad 10 may not necessarily have a shape similar to the shape of the surface of the outer layer 2, but may have a shape elongating in the direction along which the printing pad 10 is pushed. That is, a configuration may be adopted where the outer layer 2 has the smallest thickness at the apex 6 of the printing pad 10, and the thickness of the outer layer 2 gradually increases toward the peripheral portion (the support part 7). In this case, the outer layer 2 has a small amount of deformation in an area around the apex 6, and the amount of deformation of the outer layer 2 increases toward the peripheral portion.

Embodiment 2

Embodiment 2 is an embodiment obtained by changing the inner layer 1 of the printing pad 10 according to Embodiment 1. The description of a printing apparatus 100 according to Embodiment 2 will be made mainly for points different from Embodiment 1. In the drawings, the components of the printing pad 10 according to Embodiment 2 having the same functions as those in Embodiment 1 are given the same reference signs as used in the drawings for describing Embodiment 1.

(Printing Pad 10)

Figure 13:
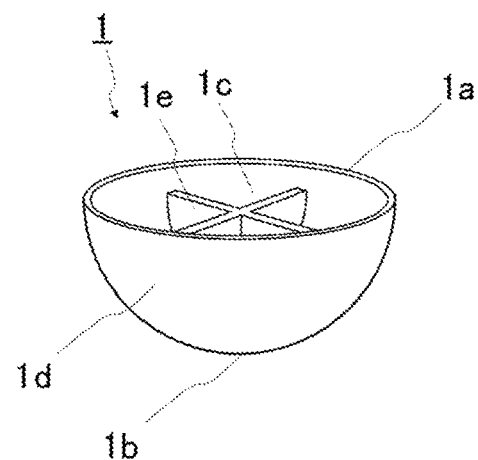
FIG. 13 is a perspective view of an inner layer 1 of a printing pad 10 according to Embodiment 2 as a single component.

FIG. 13 is a perspective view of the inner layer 1 of the printing pad 10 according to Embodiment 2 as a single component. The inner layer 1 of the printing pad 10 may have a structure that has a bowl-shaped or box-shaped cavity with one face opened. The printing pad 10 according to Embodiment 2 has one open end portion 1a, and the outer surface 1d is formed into a dome shape protruding downward in FIG. 13, that is, protruding toward an apex 1b of the printing pad 10. The outer surface 1d is formed to have a shape similar to the shape of the surface of the outer layer 2. An inner surface 1c is also formed into a dome shape protruding downward from the end portion 1a, and is formed such that a wall thickness between the inner surface 1c and the outer surface 1d is uniform. However, the form of the inner surface 1c is not limited to the above-mentioned form. As in the printing pad 10 according to the modification of Embodiment 1, the inner surface 1c may be formed to conform to the shape of a protrusion provided on the item to be printed 70, or the shape of the inner surface 1c may be set such that the wall thickness of the outer layer 2 changes. The end portion 1a is brought into contact with the support part 7 of the printing pad 10.

The inner layer 1 is made of plastic, for example, and has rigidity and strength of a level that substantially prevents the inner layer 1 from being deformed when the printing pad 10 is pushed against the item to be printed 70. Depending on a material for forming the inner layer 1, it is preferable to set a wall thickness between the inner surface 1c and the outer surface 1d, and to provide ribs 1e, for example, inside the inner layer 1 as necessary to ensure rigidity and strength. In FIG. 13, the ribs 1e are each formed into a plate shape, and intersect with each other at the center portion. However, the rib 1e is not limited to only such a form. The inner layer 1 may be a layer molded by injection molding, for example.

The inner layer 1 may have a structure where the open end portion 1a of the bowl shape shown in FIG. 13 is closed. Further, the inner layer 1 may be integrally molded with the support part 7.

Figure 14:
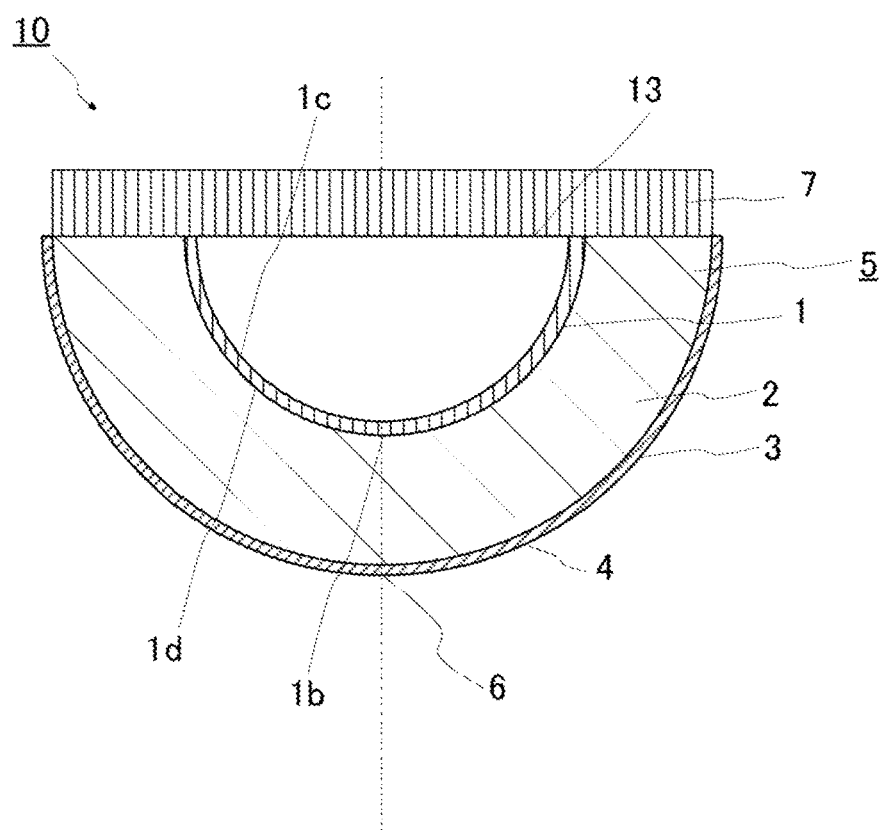
FIG. 14 is a cross-sectional view showing a modification of the printing pad 10 according to Embodiment 1.

FIG. 14 is a cross-sectional view showing a modification of the printing pad 10 according to Embodiment 1. The printing pad 10 according to Embodiment 1 may include a protective film layer 3 that covers the surface of the base 5. The protective film layer 3 forms the printing surface 4 disposed on the outside of the printing pad 10. The protective film layer 3 is formed by attaching a silicone rubber sheet with a thickness of 0.5 mm, for example, to the surface of the outer layer 2. The protective film layer 3 is provided to prevent silicone oil contained in soft silicone rubber forming the inner portion from oozing to the printing surface 4. Further, the outside surface of the protective film layer 3 forms the printing surface 4, and is repeatedly pushed against the printing original plate 50 and the surfaces to be printed 71, 72, and 73 and hence, it is necessary for the outside surface of the protective film layer 3 to have durability against scratches and wear. For this reason, the protective film layer 3 is formed by use of a material having higher hardness than does the outer layer 2, and has a small thickness to conform to the surfaces to be printed 71, 72, and 73 when the printing surface 4 is pushed against the surfaces to be printed 71, 72, and 73. In Embodiment 1, the protective film layer 3 is formed with a thickness as small as possible. It is preferable to form the protective film layer 3 with a thickness in a range of 0.1 mm to 1 mm, for example. Further, it is desirable that the protective film layer 3 have sufficient stretchability to allow the protective film layer 3 to be attached along the surface of the base 5 in a step of attaching the protective film layer 3 to the base 5. The printing pad 10 may further have a multilayer structure. For example, it is also possible to allow the outer layer 2 of the printing pad 10 shown in FIG. 13 to further have a multilayer structure made of materials having different degrees of hardness.

The protective film layer 3 is attached to the surface of the base 5. When damage, such as scratches and wear, occurs on the protective film layer 3, the protective film layer 3 may be peeled off from the surface of the base 5 and replaced with a new protective film layer. The protective film layer 3 is formed into a thin sheet shape, and is less expensive than the base 5 formed into a hemispherical shape, for example, and replacing the protective film layer 3 allows the base 5 disposed inside the protective film layer 3 to be used without any change. Therefore, renewing the protective film layer 3 allows the expensive base 5 to be repeatedly used, and it is possible to maintain the printing surface 4 of the printing pad 10 in a state suited to printing. As a result, the printing apparatus 100 according to Embodiment 1 can reduce cost required for printing.

Embodiments 1 to 2 have been described above. However, each of the embodiments merely shows one example.

The embodiments and the modifications may be combined together, or may be combined with other known techniques. Further, some components may be omitted or changed without departing from the gist of the present disclosure. Further, the printing pad 10 described above also includes combinations of features shown in the following Supplements 1 to 9. Such combinations will be described below.

Supplement 1

The printing pad 10 comprising:
the printing surface 4 to be pushed against the printing original plate 50 and the surface to be printed 71, the printing original plate 50 having ink placed on the printing original plate 50, the surface to be printed 71 being an object to be printed;
the inner layer 1 disposed inside the printing pad 10; and
the outer layer 2 provided in contact with the surface of the inner layer 1 that is closer to where the printing surface 4 is disposed than is an opposite surface of the inner layer 1,
the outer layer 2 having the printing surface 4 on the outside surface of the outer layer 2, and being formed such that the printing surface 4 is brought into close contact with the surface to be printed 71 to conform to the surface to be printed 71 when the printing surface 4 is pushed against the surface to be printed 71,
the inner layer 1 having a cavity provided in the inner layer 1.

Supplement 2

The printing pad 10 according to Supplement 1, wherein each of the inner layer 1 and the outer layer 2 is fixed to the support part 7 at a first end portion that is opposite to a second end portion that is closer to where the printing surface 4 is disposed than is the first end portion.

Supplement 3

The printing pad 10 according to Supplement 1 or 2, wherein the inner layer 1 is made of plastic foam.

Supplement 4

The printing pad 10 according to Supplement 1 or 2, wherein the inner layer 1 is a bowl-shaped part with a first end portion being open, the first end portion being opposite to a second end portion that is closer to where the printing surface 4 is disposed than is the first end portion.

Supplement 5

The printing pad 10 according to any one of Supplements 1 to 4, wherein the volume of the inner layer 1 including the cavity is 40% or less of the total of the volume of the outer layer 2 and the volume of the inner layer 1 including the cavity.

Supplement 6

The printing pad 10 according to any one of Supplements 1 to 5, wherein the surface of the inner layer 1 that is closer to where the printing surface 4 is disposed than is the opposite surface of the inner layer 1 has a shape similar to the shape of the surface of the outer layer 2 that is closer to where the printing surface 4 is disposed than is an opposite surface of the outer layer 2.

Supplement 7

The printing pad 10 according to any one of Supplements 1 to 5, wherein the shape of the surface of the inner layer 1 is similar to the shape of the surface of the outer layer 2 in a state of the printing surface 4 being pushed against the surface to be printed 71, and a recessed portion 1f provided in the surface of the inner layer 1 is formed at a position that corresponds to a recessed shape that is the shape of the surface of the outer layer 2 in a state of being pushed against the surface to be printed 71.

Supplement 8

The printing pad 10 according to any one of Supplements 1 to 5, wherein
the inner layer 1 has a shape elongating in a direction along which the printing pad 10 is pushed, and
the outer layer 2 has the smallest thickness at the apex 1b of the printing pad 10, and the thickness of the outer layer 2 gradually increases toward the peripheral portion of the printing pad 10.

Supplement 9

The printing pad 10 according to any one of Supplements 1 to 8, further comprising the protective film layer 3 provided in contact with the outside surface of the outer layer 2, wherein
the protective film layer 3 has higher Asker C hardness than does the outer layer 2, and
the printing surface 4 is formed on the outside surface of the protective film layer 3.

REFERENCE SIGNS LIST

1: inner layer, 1a: end portion, 1b: apex, 1c: inner surface, 1d: outer surface, 1e: rib, 1f: recessed portion, 2: outer layer, 2f: recessed shape, 3: protective film layer, 4: printing surface, 5: base, 6: apex, 7: support part, 10: printing pad, 11: vertically moving device, 12: horizontally moving device, 13: flat surface, 20: controller, 20a: arithmetic device, 20b: storage device, 21: pad control unit, 22: air sending unit, 23: air blowing unit, 24: activation unit, 25: ink placement unit, 26: temperature control unit, 28: temperature sensor, 40: ink, 40a: ink, 40b: ink, 40c: ink, 40d: ink, 40e: ink, 40f: ink, 40g: ink, 50: (single color) printing original plate, 51: placement surface, 52: surface layer, 53: support body, 54: recessed portion, 55: bottom portion, 56: opening port, 57: ink-phobic region, 58: ink-philic region, 60: cleaning device, 61: activation device, 62: air blowing device, 63: ink placement device, 64: ink holding unit, 65: rotary shaft, 66: blower, 66a: blowing port, 66b: inflow port, 67: heater, 68: temperature sensor, 69: acceleration sensor, 70: item to be printed, 70A: protrusion, 71: surface to be printed, 72: surface to be printed, 73: surface to be printed, 85: printing original plate stage, 86: surface treatment stage, 87: printing stage, 100: printing apparatus

The invention claimed is:
1. A printing pad comprising:
a printing surface to be pushed against a printing original plate and a surface to be printed, the printing original plate having ink placed on the printing original plate, the surface to be printed being an object to be printed;

an inner layer disposed inside the printing pad; and an outer layer provided in contact with a surface of the inner layer that is closer to where the printing surface is disposed than is an opposite surface of the inner layer, wherein the inner layer has a higher hardness than the outer layer, the outer layer having the printing surface on an outside surface of the outer layer, and being formed such that the printing surface is brought into close contact with the surface to be printed to conform to the surface to be printed when the printing surface is pushed against the surface to be printed, the inner layer having a cavity provided in the inner layer.

2. The printing pad of claim 1, wherein each of the inner layer and the outer layer is fixed to a support part at a first end portion that is opposite to a second end portion that is closer to where the printing surface is disposed than is the first end portion.

3. The printing pad of claim 1, wherein the inner layer is made of plastic foam.

4. The printing pad of claim 1, wherein a volume of the inner layer including the cavity is 40% or less of a total of a volume of the outer layer and the volume of the inner layer including the cavity.

5. The printing pad of claim 1, wherein the surface of the inner layer that is closer to where the printing surface is disposed than is the opposite surface of the inner layer has a shape similar to a shape of a surface of the outer layer that is closer to where the printing surface is disposed than is an opposite surface of the outer layer.

6. The printing pad of claim 1, wherein
the inner layer has a shape elongating in a direction along which the printing pad is pushed, and
the outer layer has a smallest thickness at an apex of the printing pad, and a thickness of the outer layer gradually increases toward a peripheral portion of the printing pad.

7. The printing pad of claim 1, further comprising a protective film layer provided in contact with the outside surface of the outer layer, wherein
the protective film layer has higher Asker C hardness than does the outer layer, and
the printing surface is formed on an outside surface of the protective film layer.

8. A printing pad, comprising:
a printing surface to be pushed against a printing original plate and a surface to be printed, the printing original plate having ink placed on the printing original plate, the surface to be printed being an object to be printed;

an inner layer disposed inside the printing pad; and an outer layer provided in contact with a surface of the inner layer that is closer to where the printing surface is disposed than is an opposite surface of the inner layer, the outer layer having the printing surface on an outside surface of the outer layer, and being formed such that the printing surface is brought into close contact with the surface to be printed to conform to the surface to be printed when the printing surface is pushed against the surface to be printed, the inner layer having a cavity provided in the inner layer, wherein the inner layer is a bowl-shaped part with a first end portion being open, the first end portion being opposite to a second end portion that is closer to where the printing surface is disposed than is the first end portion.

9. A printing pad, comprising:
a printing surface to be pushed against a printing original plate and a surface to be printed, the printing original plate having ink placed on the printing original plate, the surface to be printed being an object to be printed;

an inner layer disposed inside the printing pad; and an outer layer provided in contact with a surface of the inner layer that is closer to where the printing surface is disposed than is an opposite surface of the inner layer, the outer layer having the printing surface on an outside surface of the outer layer, and being formed such that the printing surface is brought into close contact with the surface to be printed to conform to the surface to be printed when the printing surface is pushed against the surface to be printed, the inner layer having a cavity provided in the inner layer, wherein a shape of a surface of the inner layer is similar to a shape of a surface of the outer layer in a state of the printing surface being pushed against the surface to be printed, and a recessed portion provided in the surface of the inner layer is formed at a position that corresponds to a recessed shape that is the shape of the surface of the outer layer in a state of being pushed against the surface to be printed.

* * * * *